US011010014B2

(12) United States Patent
Grossman et al.

(10) Patent No.: US 11,010,014 B2
(45) Date of Patent: May 18, 2021

(54) TECHNIQUES FOR TRANSITIONING FROM A FIRST NAVIGATION SCHEME TO A SECOND NAVIGATION SCHEME

(71) Applicant: AUTODESK, INC., San Rafael, CA (US)

(72) Inventors: Tovi Grossman, Toronto (CA); Benjamin Lafreniere, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 0 days.

(21) Appl. No.: 15/675,647

(22) Filed: Aug. 11, 2017

(65) Prior Publication Data
US 2019/0050134 A1 Feb. 14, 2019

(51) Int. Cl.
*G06F 3/0481* (2013.01)
*G06T 19/00* (2011.01)
*G06T 15/20* (2011.01)
*G06F 3/0484* (2013.01)
*G06F 3/0482* (2013.01)
*G06F 3/0485* (2013.01)
*G06T 19/20* (2011.01)

(52) U.S. Cl.
CPC ...... *G06F 3/04815* (2013.01); *G06F 3/04847* (2013.01); *G06T 15/20* (2013.01); *G06T 19/003* (2013.01); *G06F 3/0482* (2013.01); *G06F 3/0485* (2013.01); *G06F 2203/04806* (2013.01); *G06T 19/20* (2013.01)

(58) Field of Classification Search
None
See application file for complete search history.

(56) References Cited

U.S. PATENT DOCUMENTS 6,734,884 B1 * 5/2004 Berry .................. G06T 19/003
715/848
8,314,789 B2 * 11/2012 Fitzmaurice ........ G06F 3/04815
345/419

(Continued)

OTHER PUBLICATIONS

Steele; How to Build in Second Life—Edit Tool—Move, Rotate and Stretch—Sep. 15, 2014 https://www.youtube.com/watch?v=aD2nFUAN_bs (Year: 2014).*

(Continued)

*Primary Examiner* — Steven Z Elbinger
(74) *Attorney, Agent, or Firm* — Artegis Law Group, LLP

(57) ABSTRACT

Techniques for gradually transitioning a user to a second navigation scheme while using a first navigation scheme in a 3D design application that generates and displays a 3D virtual environment. The design application initially implements the first navigation scheme and a set of function tools of the standard navigation scheme. The design application monitors for a set of patterns of navigation actions during use of the first-person navigation scheme, each pattern being performed more efficiently when using the standard navigation scheme. Upon detecting a pattern using the first-person navigation scheme, the design application may switch to the standard navigation scheme. Also, upon detecting selection of a function tool, the design application may switch to the standard navigation scheme during use of the function tool. When the function tool is closed, the design application may switch back to the first-person navigation scheme.

24 Claims, 15 Drawing Sheets

(56) References Cited

U.S. PATENT DOCUMENTS

| | | |
|---|---|---|
| 9,244,590 B1 | 1/2016 | Browder |
| 2004/0001110 A1 | 1/2004 | Khan |
| 2004/0046760 A1* | 3/2004 | Roberts ............... G06F 17/5004 345/474 |
| 2005/0268247 A1 | 12/2005 | Baneth |
| 2006/0227134 A1 | 10/2006 | Khan et al. |
| 2010/0287493 A1* | 11/2010 | Majumder ............ G06F 3/0481 715/788 |
| 2012/0299940 A1* | 11/2012 | Dietrich, Jr. .......... A63F 13/358 345/522 |
| 2013/0305172 A1* | 11/2013 | Joshi ..................... G06F 3/0484 715/764 |
| 2019/0050133 A1 | 2/2019 | Grossman et al. |

OTHER PUBLICATIONS

Fitzmaurice et al., Safe 3D Navigation, published on Dec. 7, 2015, extracted from https://www.youtube.com/watch?v=WsvPhTC15OM on Nov. 20, 2018 (Year:2015). (Year: 2015).*

Safe 3D Navigation, published on Dec. 7, 2015, extracted from https://www.youtube.com/watch?v=WsvPhTC15OM on Nov. 20, 2018 (Year:2015).

Non-final Office Action for U.S. Appl. No. 15/675,645 dated Nov. 27, 2018.

Final Office Action received for U.S. Appl. No. 15/675,645 dated Apr. 2, 2019, 22 pages.

Non-Final Office Action received for U.S. Appl. No. 15/675,645 dated Sep. 13, 2019, 21 pages.

Final Office Action for U.S. Appl. No. 15/675,645, dated Jan. 28, 2020, 20 pages.

* cited by examiner

TECHNIQUES FOR TRANSITIONING FROM A FIRST NAVIGATION SCHEME TO A SECOND NAVIGATION SCHEME

BACKGROUND OF THE INVENTION

Field of the Invention

Embodiments of the present invention relate generally to a three-dimensional (3D) design application, and, more specifically, to techniques for transitioning from a first navigation scheme to a second navigation scheme.

Description of the Related Art

Three-dimensional (3D) design applications, such as computer-aided design (CAD) applications, are commonly used by architects, engineers, and other design professionals to aid in the creation, modification, analysis, or optimization of a design. Among other things, using 3D design applications can substantially increase the productivity of the designer and/or improve the overall quality of a design. For example, a CAD application may be used to construct computer models representing a real-world construct, such as an office building, an airplane, an electronic appliance, and the like. CAD applications may increase productivity and improve the quality of the design, such as architectural designs, construction designs, engineering drawings, or presentation drawings for marketing, sales, and the like. The output of a 3D design application may also include electronic files comprising a 3D printable design that can be exported to a fabrication device (e.g., 3D printer) that fabricates a physical 3D product based on the 3D printable design. Advances in fabrication techniques allow highly complex three-dimensional (3D) geometries to be fabricated using 3D printers.

Typically, a 3D design application may generate and display a 3D virtual environment containing virtual objects. The 3D virtual environment may represent a virtual or real-world environment, and the virtual objects may represent virtual or real-world objects. A designer may navigate through the 3D virtual environment and interact (e.g., create, remove, or modify) with the virtual objects within the 3D virtual environment. To navigate the 3D virtual environment, typically the 3D design application implements a "standard" navigation scheme using orbit, pan, and zoom navigation tools. The standard navigation scheme is specifically optimized for object-centric navigation (navigation focused on the object being worked on) that is particularly useful in 3D design applications. Although the standard navigation scheme is effective and efficient for experienced users of 3D design applications, the standard navigation scheme can be non-intuitive, difficult, and frustrating to novice users of 3D design applications. Currently, 3D design applications are increasingly being used by such non-experts groups, who are primarily interested in quickly achieving results with the 3D design applications without having to undergo dedicated or formal training. As discussed, the conventional navigation technology (standard navigation scheme) has proven difficult for beginner users to use proficiently, and often results in beginners discontinuing use of the 3D design applications. However, effective techniques for helping users become more skilled and proficient with the standard navigation scheme have not been developed.

As the foregoing illustrates, there is a need in the art for a technique for assisting beginner users to become more skilled and proficient with the standard navigation scheme.

SUMMARY OF THE INVENTION

One embodiment of the invention includes a computer-implemented method for navigating a three-dimensional (3D) virtual environment that includes one or more objects. The method includes enabling a first navigation scheme for navigating the 3D virtual environment and receiving a plurality of inputs based on the first navigation scheme that cause a first set of navigation actions to occur within the 3D virtual environment. The method also includes, based on a set of navigation patterns, determining that the first set of navigation actions comprises a particular navigation pattern and in response, enabling a second navigation scheme for navigating the 3D virtual environment.

Another embodiment of the invention includes a computer-implemented method for navigating a three-dimensional (3D) virtual environment. The method includes enabling a first navigation scheme for navigating the 3D virtual environment and a set of function tools for manipulating virtual objects included within the 3D virtual environment. The method also includes receiving a selection of a first function tool included in the set of function tools and after receiving the selection of the first function tool, enabling a second navigation scheme for allowing a first virtual object included within the 3D virtual environment to be manipulated via the first function tool.

At least one advantage of the disclosed technique is that the technique enables a user to use a more familiar or intuitive navigation scheme (first navigation scheme) when using a 3D design application, and then transition the user to the less familiar or intuitive standard navigation scheme (second navigation scheme) implemented by most 3D design applications.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
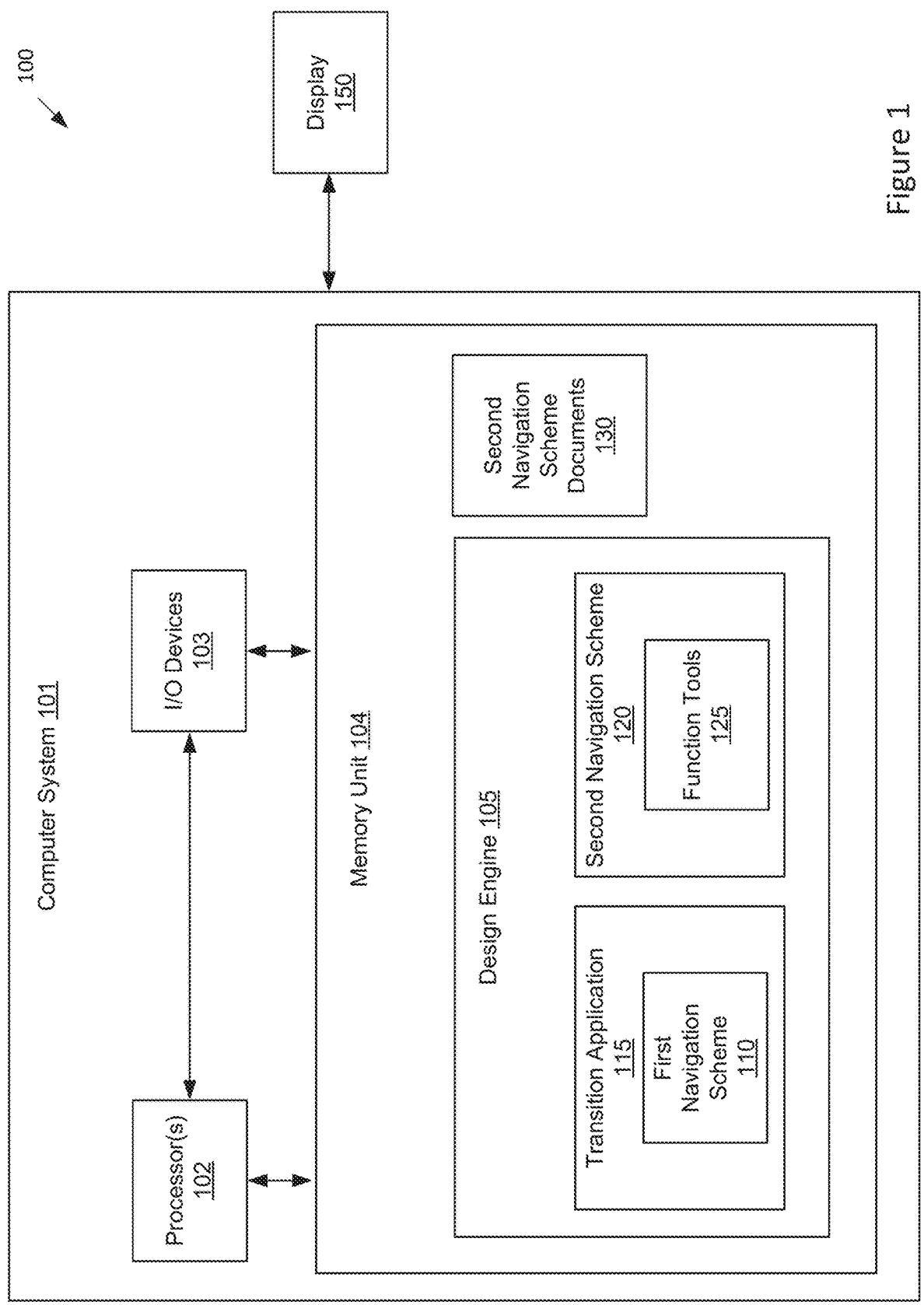
FIG. 1 is a block diagram of a three-dimensional (3D) design application system configured to implement one or more aspects of the present invention.

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

The following description is divided into three sections. Section I describes an architecture of a 3D design application system within which embodiments of the present invention may be implemented. Section II describes systems and methods for transitioning to a second navigation scheme when a predetermined pattern of navigation actions using a first navigation scheme is detected. Section III describes systems and methods for transitioning to the second navigation scheme when a function tool is used while in the first navigation scheme.

Embodiments of the invention are directed towards techniques for gradually transitioning a user to a second navigation scheme while using a first navigation scheme in a 3D design application. The 3D design application generates and displays a 3D virtual environment containing virtual objects. The 3D design application may implement the second navigation scheme comprising a standard navigation scheme. The standard navigation scheme may include a set of navigation tools (such as orbit, pan, and zoom tools) and a set of function tools (such as move, fillet, and box tools). The 3D design application may further implement the first navigation scheme comprising a first-person navigation scheme including a set of navigation tools (such as camera position and camera orientation tools). The 3D design application may initially enable the first-person navigation scheme, whereby the user initially navigates through the 3D virtual environment and interacts (e.g., create, remove, or modify) with the virtual objects using the first-person navigation scheme.

As described in Section II, the 3D design application monitors for a set of predetermined patterns of navigation actions during use of the first-person navigation scheme. Each predetermined pattern of navigation actions using the first-person navigation scheme may be performed more efficiently when using the standard navigation scheme. If the 3D design application detects a predetermined pattern using the first-person navigation scheme, the 3D design application may manually or automatically switch the first-person navigation scheme to the standard navigation scheme. As described in Section III, while the user is using the first-person navigation scheme, the 3D design application monitors for user selection of a function tool of the standard navigation scheme. The function tool comprises a function tool for configuring/manipulating a virtual object that is object-centric and designed for use with the standard navigation scheme. If the 3D design application detects a user selection of a function tool, the 3D design application may automatically switch the first-person navigation scheme to the standard navigation scheme during use of the function tool. When the user is finished using the function tool, the 3D design application may automatically switch the standard navigation scheme back to the first-person navigation scheme.

Section I: 3D Design Application System and Hardware

FIG. 1 is a block diagram of a 3D design application system 100 configured to implement one or more aspects of the present invention. As shown, the system 100 includes, without limitation, a computer system 101 connected to a display device 150. The computer system 101 may comprise at least one processor 102, input/output (I/O) devices 103, and a memory unit 104 coupled together. The computer system 101 may comprise a server, personal computer, laptop or tablet computer, mobile computer system, or any other device suitable for practicing various embodiments described herein.

In general, a processor 102 may be any technically feasible processing device or hardware unit capable of processing data and executing software applications and program code. The processor 102 executes the software and performs the functions and operations set forth in the embodiments described herein. For example, a processor 102 may comprise a central processing unit (CPU), a graphics processing unit (GPU), a digital signal processor (DSP), an application-specific integrated circuit (ASIC), a field programmable gate array (FPGA) or other programmable logic device, discrete gate or transistor logic, discrete hardware components, or any combination of different processing units, such as a CPU configured to operate in conjunction with a GPU.

The memory unit 104 may include a hard disk, a random access memory (RAM) module, a flash memory unit, or any other type of memory unit or combination thereof. Processor 102 and I/O devices read data from and write data to memory 104. The memory unit 104 stores software application(s) and data. Instructions from the software constructs within the memory unit 104 are executed by processors 102 to enable the inventive operations and functions described herein. In various embodiments, the memory unit 104 stores a design engine 105 and second navigation scheme documents 130 (comprising learning materials and/or tutorials related to the second navigation scheme). The design engine 105 comprises a 3D design application (such as a computer-aided design application) that implements a second navigation scheme 120 (including function tools 125). The design engine 105 also comprises a transition application 115 that includes a first navigation scheme 110. The processor 102 is configured to execute the design engine 105 to provide an underlying functionality of a 3D design application system as described in various embodiments herein.

I/O devices 103 are also coupled to memory 104 and may include devices capable of receiving input, such as a keyboard, a mouse, a trackball, and so forth (e.g., for receiving user inputs for navigating and interacting with virtual objects in a 3D virtual environment that is generated and displayed by the 3D design application system 100). I/O devices 103 also include devices capable of providing output, such as a display monitor, speaker, and so forth. For example, I/O devices 103 may include a fabrication device 160 comprising any device capable of fabricating/producing a physical product based on a 3D design. For example, the fabrication device may comprise a 3D printer or any CNC machine capable of producing physical 3D products using one or more different materials. I/O devices 103 may receive various types of input from an end-user, and to also provide various types of output to the end-user of the 3D design application system 100. In particular, the I/O devices may further include a display device 150. The display 150 may display visual feedback to the user to assist in navigating and interacting with virtual objects in a 3D virtual environment that is generated and displayed by the 3D design application system 100. The display 150 may comprise a device capable of both receiving input and providing output, such as a touchscreen display.

The design engine 105 executes a 3D design application that implements a second navigation scheme 120. In some embodiments, the second navigation scheme 120 comprises a standard navigation scheme that includes a set of navigation tools (such as orbit, pan, and zoom tools) and a set of function tools 125 (such as move, fillet, and box tools). The transition application 115 comprises a first navigation scheme 110 and software modules to perform embodiments described herein for transitioning from the first navigation scheme 110 to the second navigation scheme 120. In some embodiments, the first navigation scheme 110 comprises a first-person navigation scheme that includes a set of navigation tools (such as camera position and camera orientation tools). The transition application 115 may comprise a stand-alone application that operates in conjunction with the 3D design application or comprise a plug-in application to the 3D design application for providing functions and operations set forth in the embodiments described herein. In the embodiments described below, the first navigation scheme 110 comprises a first-person navigation scheme and the second navigation scheme 120 comprises a standard navigation scheme. However, in other embodiments, the first navigation scheme 110 may comprise another type of 3D navigation/control scheme and/or the second navigation scheme 120 may comprise another type of 3D navigation/control scheme.

For beginner users, the first-person navigation scheme may be more familiar and intuitive than the standard navigation scheme typically implemented in 3D design applications. Many users may have prior experience with the first-person navigation scheme as it is a navigation scheme used in many popular video games. Also, when navigating a 3D virtual environment with the first-person navigation scheme, a camera view simulates what a person would see while moving through the 3D virtual environment and viewing and interacting with virtual objects within the 3D virtual environment. Further, the first-person navigation scheme does not utilize a fixed pivot point, which is often difficult for beginners to understand and use effectively. The first-person navigation scheme may be considered a person-centric navigation scheme featuring a first-person point of view that more naturally maps to everyday experience of navigating the real world. Thus, the first-person navigation scheme may be more familiar and intuitive for beginner users than other 3D navigation schemes (such as the standard navigation scheme).

Figure 2:
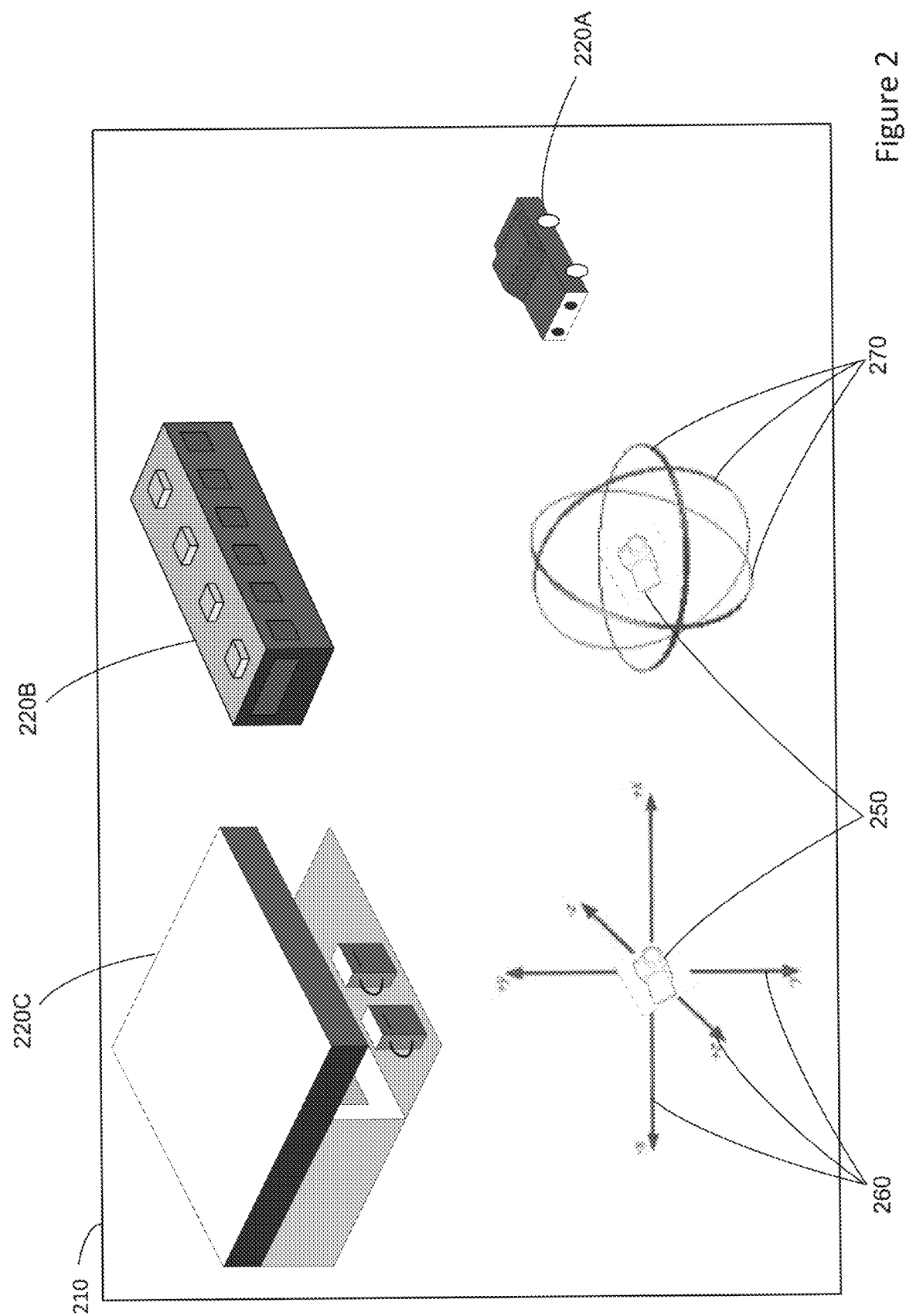
FIG. 2 is a conceptual illustration of a graphical user interface (GUI) implementing a first-person navigation scheme, according to various embodiments of the present invention.

FIG. 2 is a conceptual illustration of a graphical user interface (GUI) screenshot 210 implementing a first-person navigation scheme, according to various embodiments of the present invention. The screenshot 210 shows a current camera view of a 3D virtual environment that is displayed on a display device 150. The current camera view corresponds to the current view of a virtual camera being navigated by the user through the 3D virtual environment. In the example of FIG. 2, the 3D virtual environment is generated and displayed by the design engine 105 while implementing the first navigation scheme 110 (first-person navigation scheme). The 3D virtual environment comprises a plurality of virtual objects, including a first object 220A (car), second object 220B (diner), and a third object 220C (gas station). In the first-person navigation scheme, the displayed camera view shows a view of a virtual camera 250 as it is moved in different directions (in cardinal directions) and oriented at different angles within the 3D virtual environment through a set of navigation tools. The first-person navigation scheme includes a set of navigation tools, such as camera position and camera orientation tools. The design engine 105 may receive various user inputs (e.g., via a mouse, keyboard, touchscreen, or combination thereof) that move the camera position of the virtual camera 250 within the 3D virtual environment. The camera position of the virtual camera 250 may be moved along any of three axes 260 (x, y, z axes) of the 3D virtual environment, as conceptually illustrated in FIG. 2. Thus, the virtual camera 250 may be moved left, right, up, down, forwards, and background within the 3D virtual environment. The design engine 105 may receive various user inputs (e.g., via a mouse, keyboard, touchscreen, or combination thereof) that move the camera orientation of the virtual camera 250 within the 3D virtual environment. The camera orientation may be rotated 360 degrees along any of three axes 260 (x, y, z axes) of the 3D virtual environment, as conceptually illustrated in FIG. 2 by three rotation circles 270 surrounding the virtual camera 250. Based on the received user inputs for the camera position and camera orientation, the design engine 105 generates and displays an updated camera view corresponding to the updated camera position and camera orientation.

Figure 3:
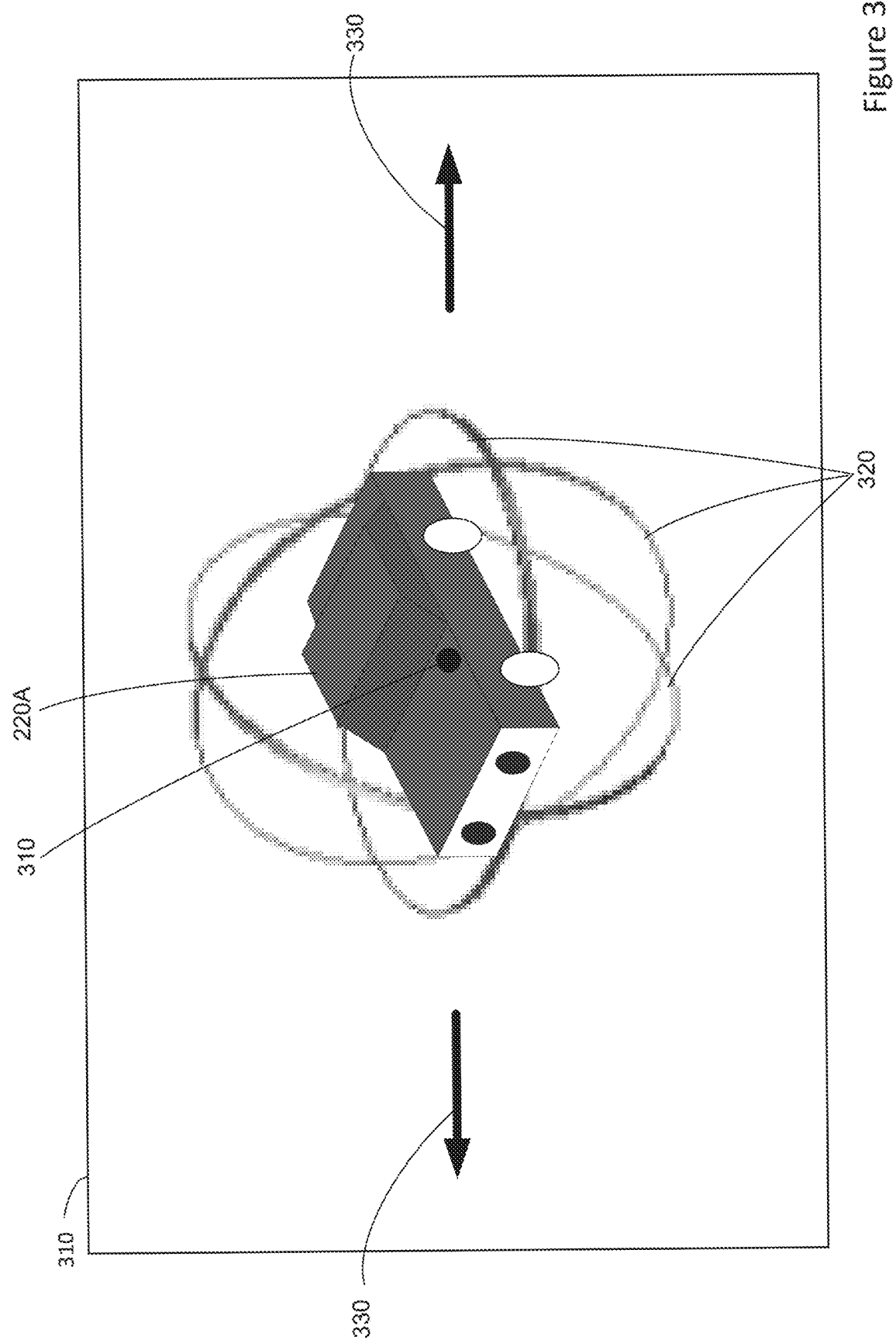
FIG. 3 is a conceptual illustration of a GUI through which a standard navigation scheme is being implemented, according to various embodiments of the present invention.

FIG. 3 is a conceptual illustration of a GUI screenshot 310 through which a standard navigation scheme is being implemented, according to various embodiments of the present invention. The screenshot 310 shows a current camera view of a 3D virtual environment that is displayed on a display device 150. In the example of FIG. 3, the 3D virtual environment is generated and displayed by the design engine 105 while implementing the second navigation scheme 120 (standard navigation scheme). In the example of FIG. 3, the current camera view shows the first object 220A (car) within the 3D virtual environment. The standard navigation scheme typically utilized in 3D design applications is optimized for efficient object-centric navigation (i.e., navigation focused on an object being worked on) and may be difficult or frustrating to use for novices. The standard navigation scheme comprises a set of navigation tools that allow the user to view different areas of the 3D virtual environment and interact with virtual objects for further processing (via a function tool). In the standard navigation scheme, the camera view displays the 3D virtual environment based on a fixed pivot point 310 utilized by the set of navigation tools. As a default, the fixed pivot point 310 may be located in the center of the camera view. However, the user may also set another location for the fixed pivot point 310. The set of navigation tools may include orbit, pan, and zoom tools. The standard navigation scheme also includes a set of function tools 125 for creating, deleting, configuring, and modifying objects (as discussed below in Section III).

The user may use the orbit tool to rotate the 3D virtual environment (and thus rotate the object of focus) around the fixed pivot point 310. The 3D virtual environment and object may be rotated 360 degrees along any of three axes (x, y, z axes) of the 3D virtual environment, as conceptually illustrated in FIG. 3 by three rotation circles 320 surrounding the first object 220A. Rotating the 3D virtual environment and object via the orbit tool changes the camera orientation to the 3D virtual environment to enable viewing of an object at various different angles. The user may also set a new fixed pivot point within the 3D virtual environment for the orbit tool.

The user may use the pan tool to move the camera view to view/display other areas of the 3D virtual environment without changing the current camera orientation angle. The user may pan the camera view in various directions along an axis of the 3D virtual environment, as conceptually illustrated by the panning arrows 330 in FIG. 3. The user may also pan the camera view to a different area of the 3D virtual environment to set a new fixed pivot point within the 3D virtual environment.

The user may utilize the zoom tool to perform zoom in and out functions which zooms the camera view in and out within the 3D virtual environment around the fixed pivot point 310. When the fixed pivot point 310 is on or adjacent to an object of focus (such as first object 220A), the zoom in function generates a camera view that makes the object appear larger and with greater detail. In contrast, the zoom out function generates a camera view that makes the object appear smaller and with less detail. Based on the received user inputs for the orbit, pan, and zoom tools, the design engine 105 generates and displays an updated camera view in accordance with the received user inputs.

Section II: Transitioning the Navigation Scheme when Pattern Detected

In some embodiments, the design engine 105 may initially enable the first navigation scheme (first-person navigation scheme). The design engine 105 monitors the user's movement and view orientation (camera position and camera orientation) while the user navigates the 3D virtual environment using the first-person navigation scheme to detect particular patterns of navigation actions/tasks. For example, the design engine 105 may monitor for a set of predetermined patterns of object viewing, whereby each predetermined pattern of object viewing using the first-person navigation scheme has been determined to be performed more efficiently when using the standard navigation scheme. The set of predetermined patterns may be stored to a memory 104 of the computer system 101 as part of the transition application 115. If the design engine 105 detects a predetermined pattern using the first-person navigation scheme, the design engine 105 may manually or automatically switch the first-person navigation scheme to the standard navigation scheme.

Figure 4A:
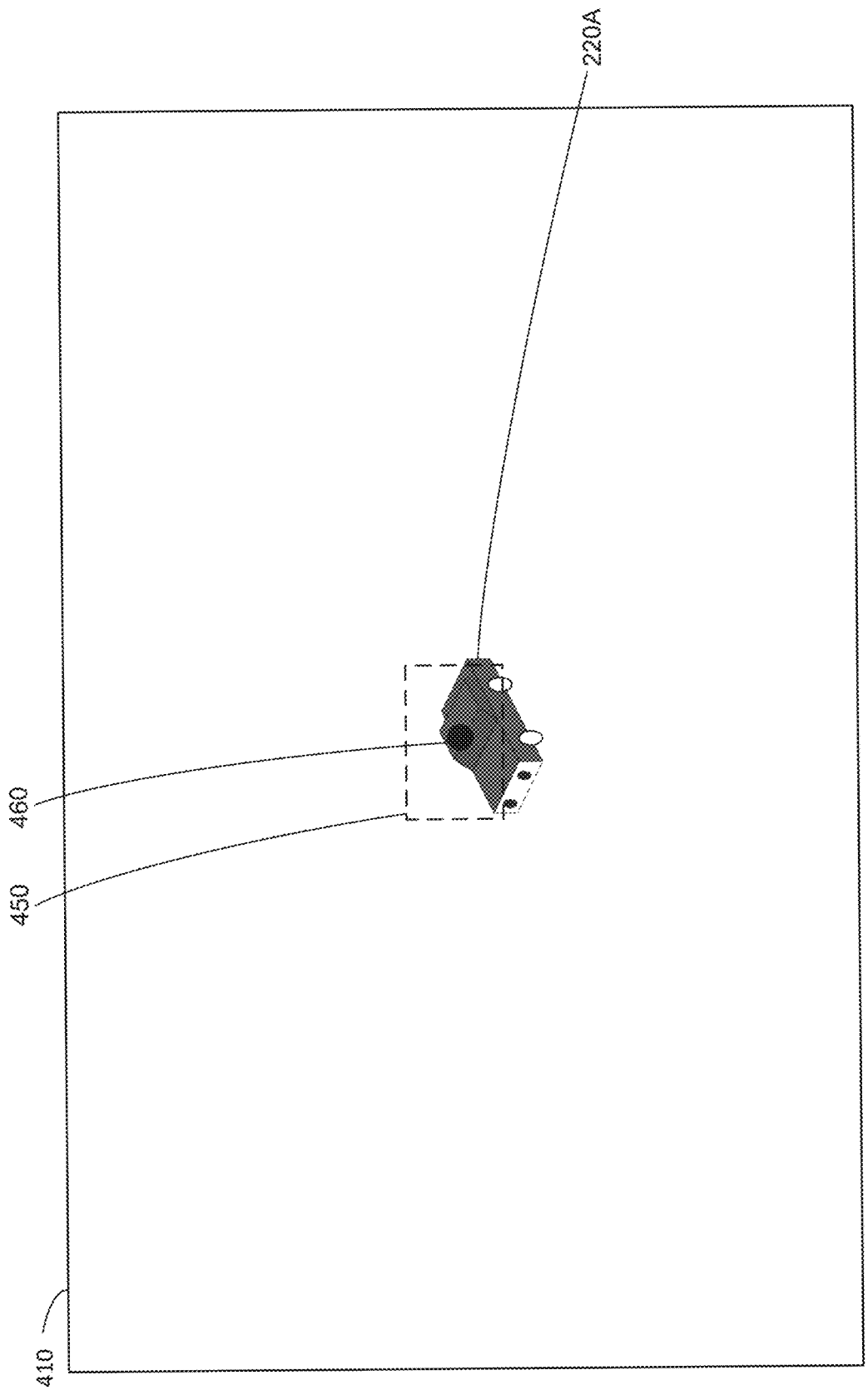
FIG. 4A is a conceptual illustration of a GUI displaying a first camera view of a first predetermined pattern, according to various embodiments of the present invention.
Figure 4B:
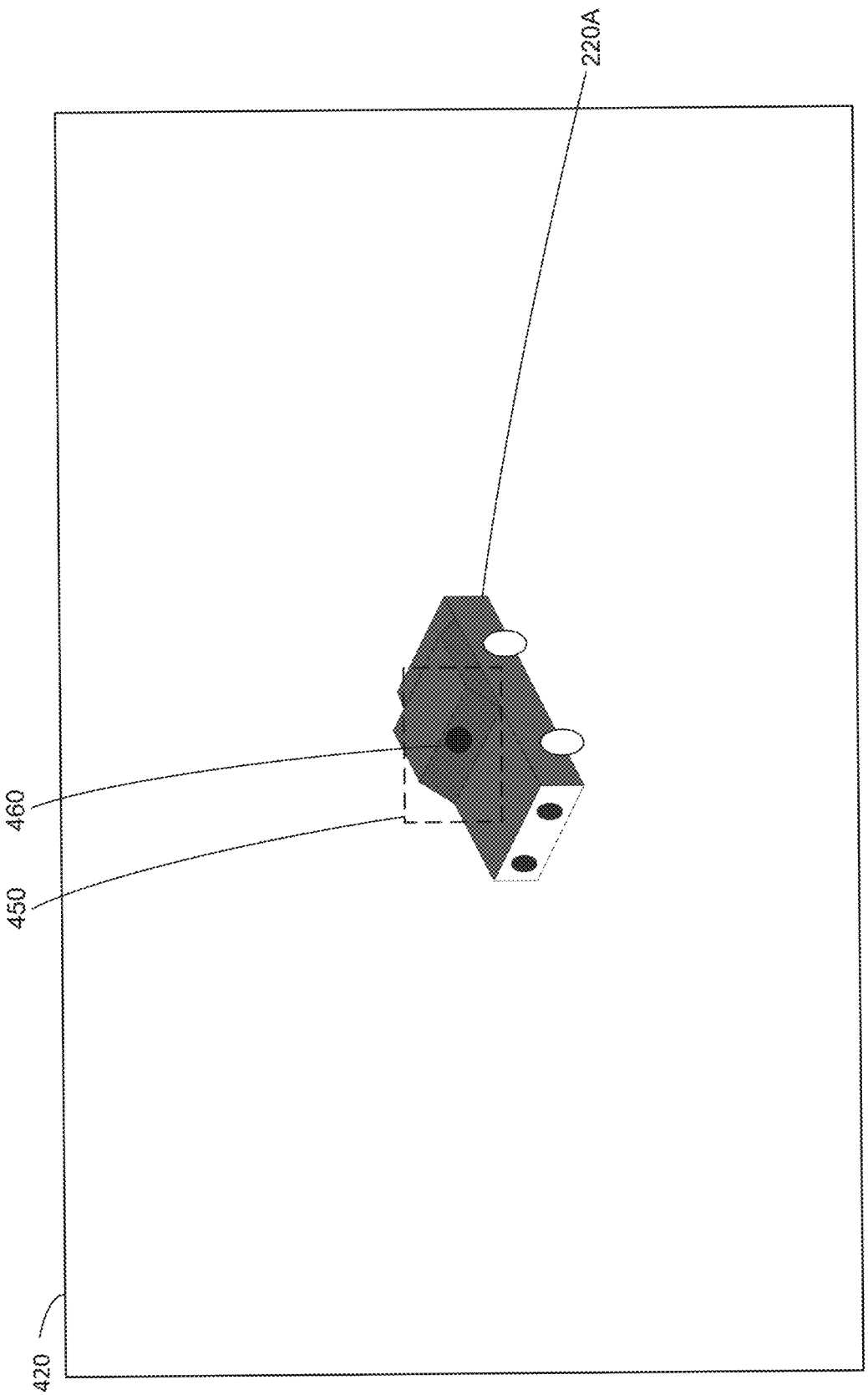
FIG. 4B is a conceptual illustration of a GUI displaying a second camera view of the first predetermined pattern, according to various embodiments of the present invention.
Figure 4C:
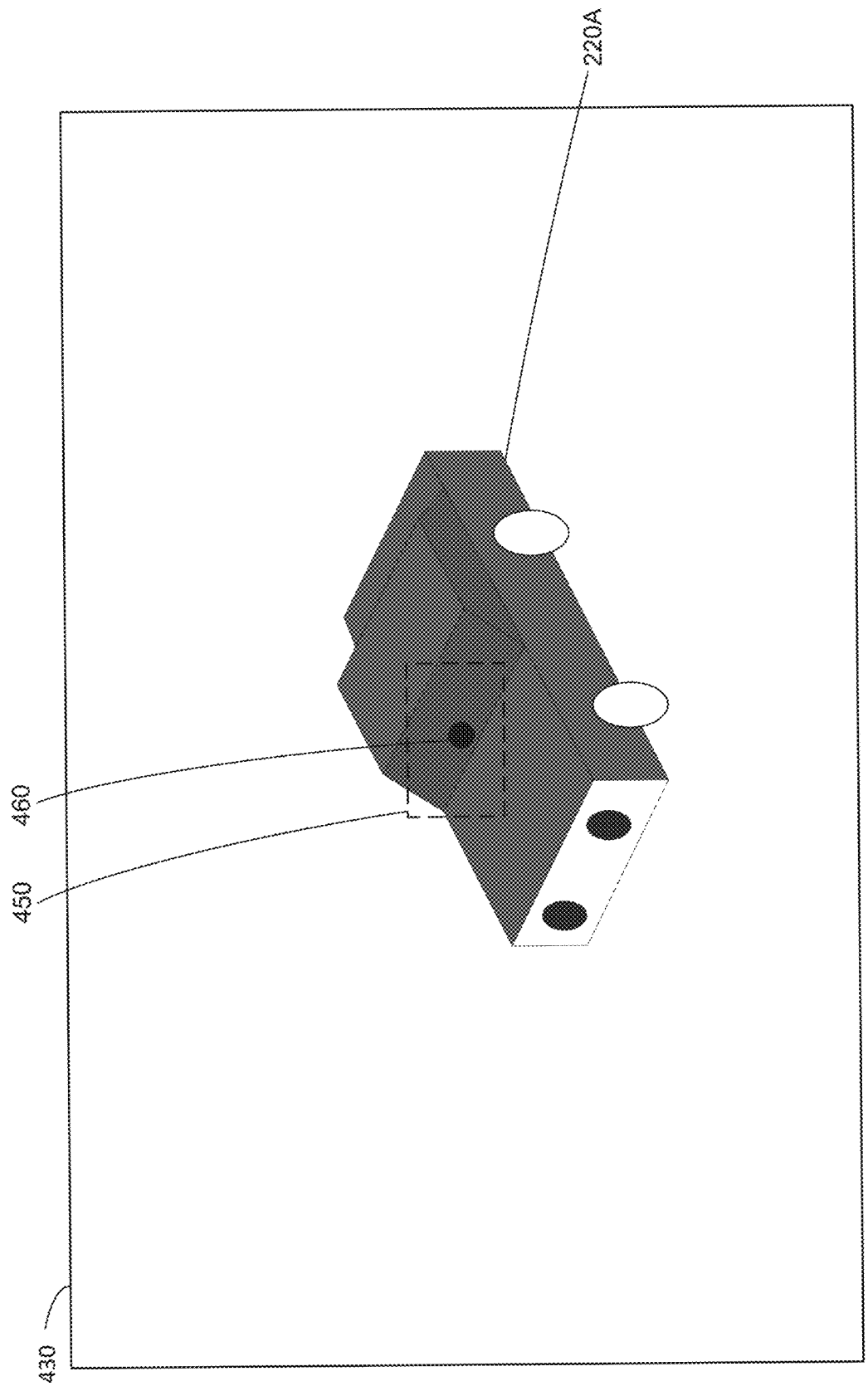
FIG. 4C is a conceptual illustration of a GUI displaying a third camera view of the first predetermined pattern, according to various embodiments of the present invention.

FIGS. 4A-C show GUI screenshots illustrating a first predetermined pattern of object viewing using the first-person navigation scheme, according to various embodiments of the present invention. In the example shown, the first predetermined pattern comprises a pattern of the user viewing a same object (first object 220A) at different distances within the 3D virtual environment.

FIG. 4A is a conceptual illustration of a GUI screenshot 410 displaying a first camera view of a first predetermined pattern, according to various embodiments of the present invention. The first camera view shows the first object 220A located at or near the center of the camera view, whereby the user has navigated the camera position to a far distance from the first object 220A within the 3D virtual environment using the first-person navigation scheme. FIG. 4B is a conceptual illustration of a GUI screenshot 420 displaying a second camera view of the first predetermined pattern, according to various embodiments of the present invention. The second camera view shows the first object 220A still located at or near the center of the camera view, whereby the user has navigated the camera position to a closer distance from the first object 220A (relative to the first camera view) within the 3D virtual environment using the first-person navigation scheme. FIG. 4C is a conceptual illustration of a GUI screenshot 430 displaying a third camera view of the first predetermined pattern, according to various embodiments of the present invention. The third camera view shows the first object 220A still located at or near the center of the camera view, whereby the user has navigated the camera position to a closer distance from the first object 220A (relative to the second camera view) within the 3D virtual environment using the first-person navigation scheme.

Thus, FIGS. 4A-C show a first pattern of navigation actions that focus on a same object of interest (first object 220A), whereby the user is viewing the same object at multiple different distances (far, closer, and closest) for a certain period of time. In particular, a received set of user inputs cause to be performed a set of navigation actions comprising the first pattern of navigation actions. Such a pattern of navigation actions that focus on a same object comprise object-centric navigation actions that may be more efficiently performed using the standard navigation scheme (object-centric navigation scheme). In particular, the first pattern of navigation actions comprises the user focusing on the same object while moving the camera position forward (to make the object appear larger) or backwards (to make the object appear smaller) from the same object using the first-person navigation scheme. Thus, the first pattern of navigation actions may be more efficiently performed by using the standard navigation scheme by utilizing the zoom tool to zoom in (to make the object appear larger) and zoom out (to make the object appear smaller) while viewing the same object.

Figure 5A:
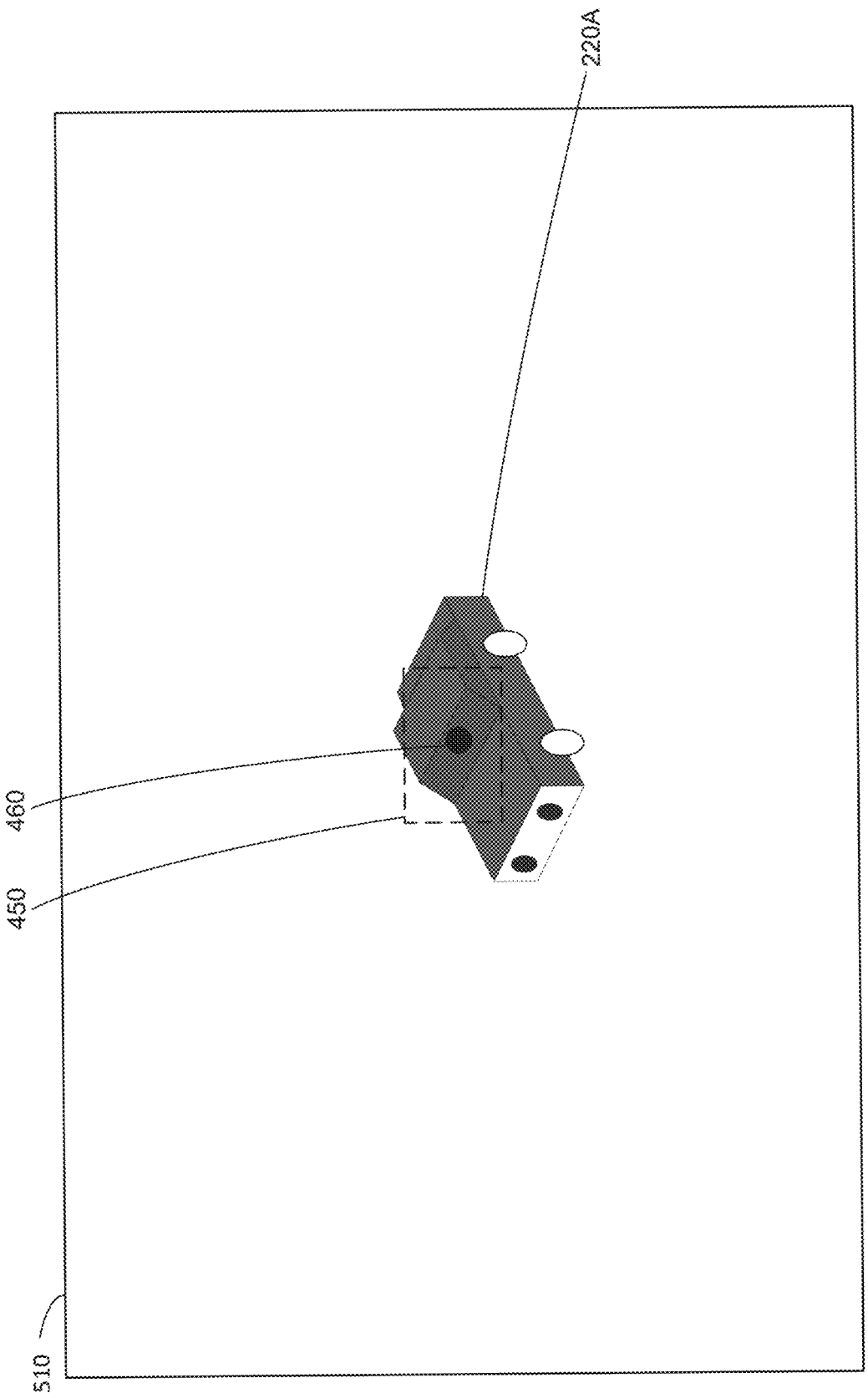
FIG. 5A is a conceptual illustration of a GUI displaying a first camera view of a second predetermined pattern, according to various embodiments of the present invention.
Figure 5B:
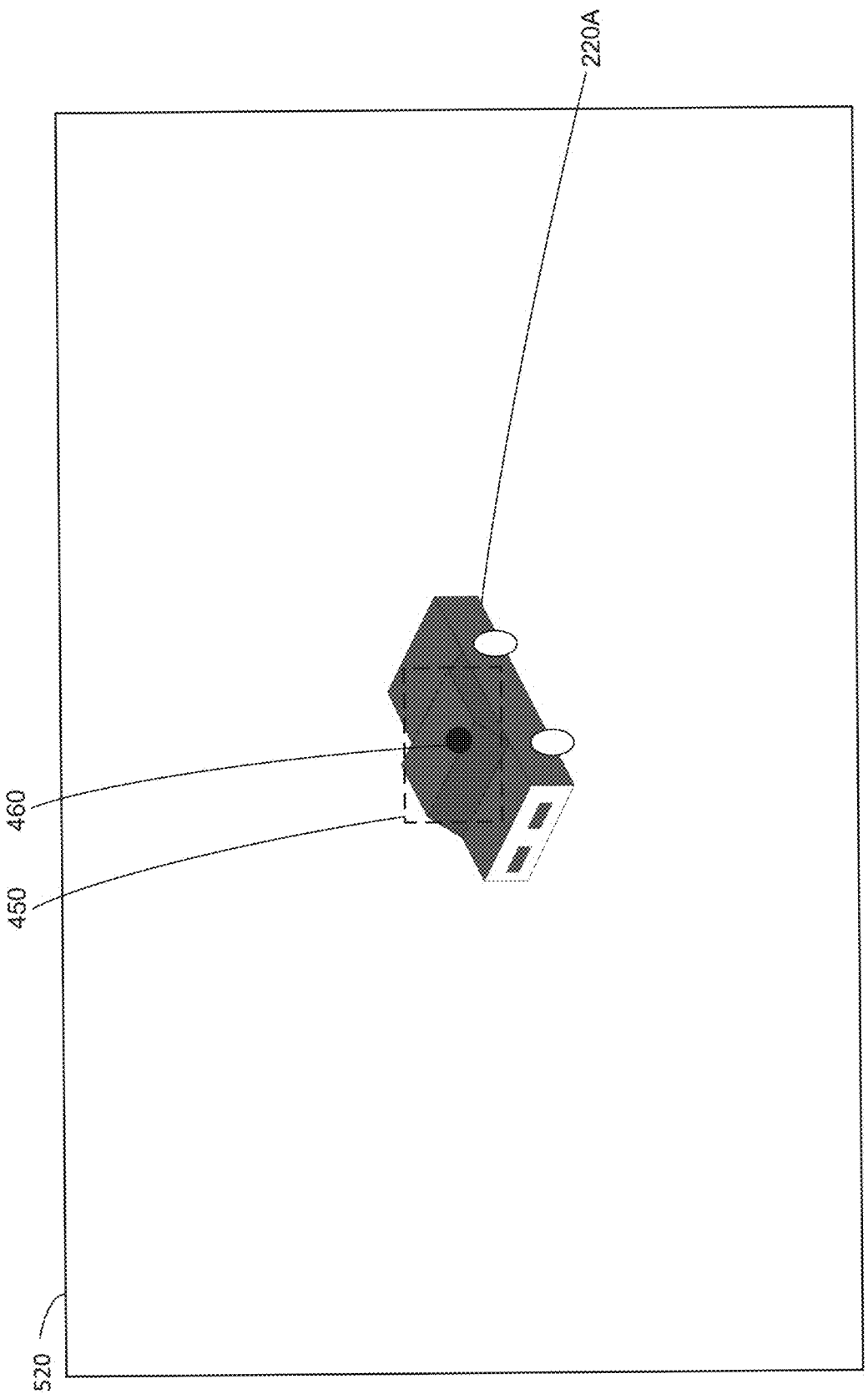
FIG. 5B is a conceptual illustration of a GUI displaying a second camera view of the second predetermined pattern, according to various embodiments of the present invention.
Figure 5C:
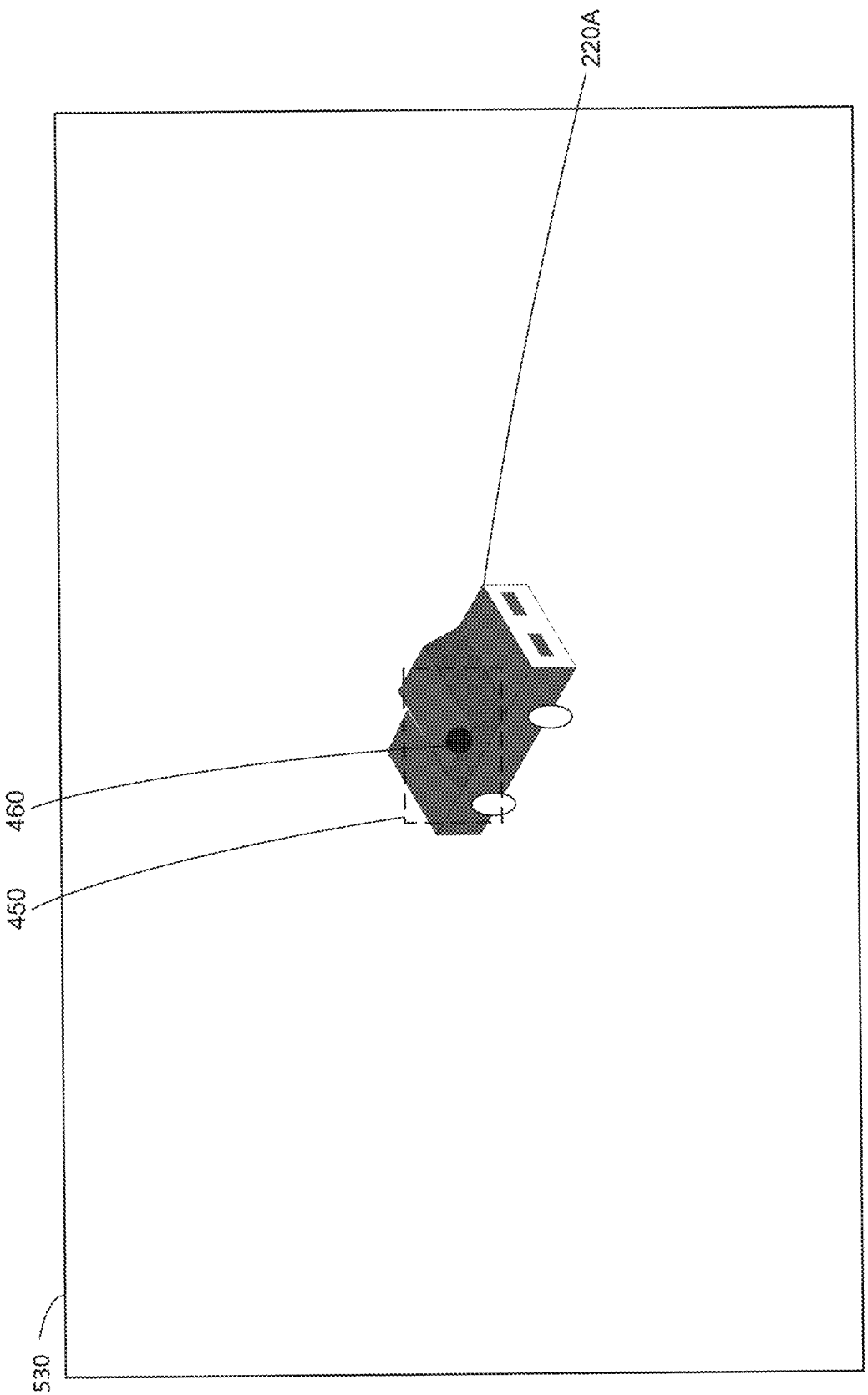
FIG. 5C is a conceptual illustration of a GUI displaying a third camera view of the second predetermined pattern, according to various embodiments of the present invention.

FIGS. 5A-C show GUI screenshots illustrating a second predetermined pattern of object viewing using the first-person navigation scheme, according to various embodiments of the present invention. In the example shown, the second predetermined pattern comprises a pattern of the user viewing a same object (first object 220A) at different angles within the 3D virtual environment.

FIG. 5A is a conceptual illustration of a GUI screenshot 510 displaying a first camera view of a second predetermined pattern, according to various embodiments of the present invention. The first camera view shows the first object 220A located at or near the center of the camera view, whereby the user has navigated the camera position and camera orientation to view the first object 220A at a first angle using the first-person navigation scheme. FIG. 5B is a conceptual illustration of a GUI screenshot 520 displaying a second camera view of the second predetermined pattern, according to various embodiments of the present invention. The second camera view shows the first object 220A still located at or near the center of the camera view, whereby the user has navigated the camera position and camera orientation to view the first object 220A at a second angle using the first-person navigation scheme. FIG. 5C is a conceptual illustration of a GUI screenshot 530 displaying a third camera view of the second predetermined pattern, according to various embodiments of the present invention. The third camera view shows the first object 220A still located at or near the center of the camera view, whereby the user has navigated the camera position and camera orientation to view the first object 220A at a third angle using the first-person navigation scheme, the first, second and third angles comprise different angles corresponding to different camera positions and camera orientations of the virtual camera.

Thus, FIGS. 5A-C show a second pattern of navigation actions that focus on a same object of interest (first object 220A), whereby the user is viewing the same object at multiple different angles for a certain period of time. In particular, a received set of user inputs cause to be performed a set of navigation actions comprising the second pattern of navigation actions. Such a pattern of navigation actions that focus on a same object comprise object-centric navigation actions that may be more efficiently performed using the standard navigation scheme (object-centric navigation scheme). In particular, the second pattern of navigation actions comprises the user focusing on the same object while moving the camera position around the same object, while also changing the camera orientation to keep the same object at or near the center of the camera view using the first-person navigation scheme. Thus, the second pattern of navigation actions may be more efficiently performed by using the standard navigation scheme by utilizing the orbit tool to rotate the object (around a fixed pivot point 310) to more easily view the object at various different angles.

The first and second patterns of navigation actions shown in FIGS. 4A-C and 5A-C are for illustrative purposes only. In other embodiments, the set of predetermined patterns may comprise other patterns of navigation actions using the first-person navigation scheme. Other patterns of navigation actions using the first-person navigation scheme that may be included in the set of patterns may comprise any pattern of navigation actions that focus on a same object (for a threshold time period) and comprise object-centric navigation actions that are determined to be more efficiently performed using the standard navigation scheme (object-centric navigation scheme). The set of predetermined patterns may be stored to a memory 104 of the computer system 101 as part of the transition application 115.

Further, the design engine 105 may implement various techniques to determine which specific object within the 3D virtual environment that the user is currently focusing (referred to herein as the "object of focus"). For example, the design engine 105 may determine a center area 450 (shown in FIGS. 4A-C and 5A-C) within the current camera view that is centered on a center point of the current camera view (i.e., the center area 450 and the current camera view have the same center point). The center area 450 may comprise predetermined height and width dimensions (in pixels). If the design engine 105 determines that a particular object is within or overlaps the center area 450, the design engine 105 may determine that the particular object is the object of focus for the user. As another example, the design engine 105 may project a virtual ray from the center of the virtual camera 250 that intersects a plane of the current camera view at an intersection point 460 (the center point of the current camera view), as shown in FIGS. 4A-C and 5A-C. If the design engine 105 determines that the intersection point 460 intersects/overlaps a particular object, the design engine 105 may determine that the particular object is the object of focus.

In some embodiments, the design engine 105 may also require that a same object comprise the object of focus for a threshold time period before the design engine 105 determines that a predetermined pattern of navigation actions has been detected. In particular, the design engine 105 may determine that the set of user inputs cause to be performed a set of navigation actions that focus on the same object for a threshold time period before determining that the predetermined pattern of navigation actions has been detected. Utilizing the threshold time period may eliminate instances where the user is quickly navigating through the 3D virtual environment and only incidentally views the same object at different distances or at different angles. Utilizing the threshold time period before determining that a predetermined pattern of navigation actions has been detected helps ensure that the object of focus is in fact an object of interest for the user and may be navigated more efficiently using the object-centric navigation scheme.

Figure 6:
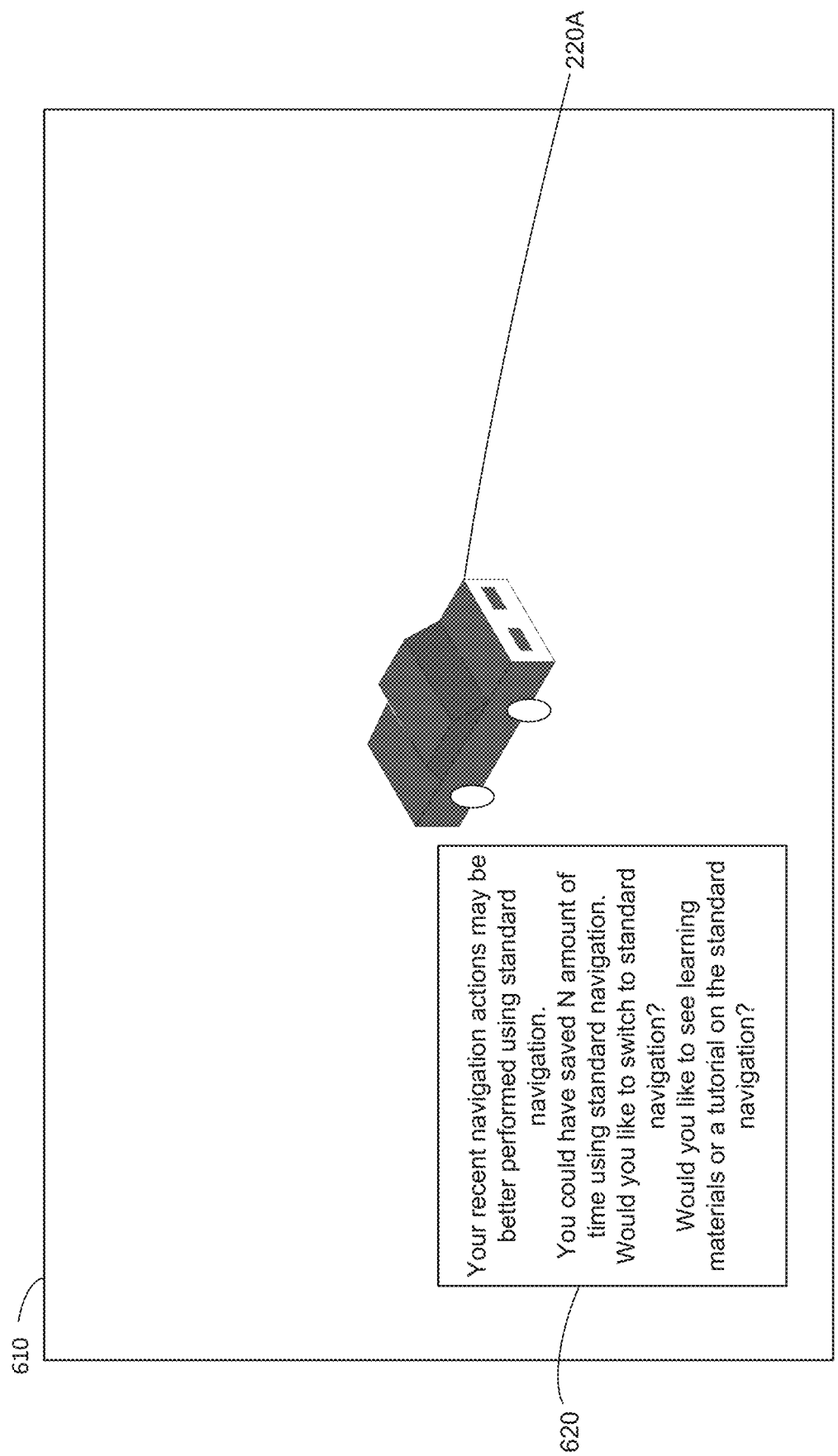
FIG. 6 is a conceptual illustration of a GUI displaying an information window in response to a predetermined pattern being detected, according to various embodiments of the present invention.

Upon detecting a pattern of navigation actions in the set of patterns, the design engine 105 may perform one or more responsive operations. For example, the design engine 105 may generate and display an information window. FIG. 6 is a conceptual illustration of a GUI screenshot 610 displaying an information window 620 in response to a predetermined pattern being detected, according to various embodiments of the present invention. As shown, the information window 620 may contain one or more statements and/or user selectable prompts. For example, the information window 620 may generate and display a first statement informing the user that the recent navigation actions may be more efficiently performed using the standard navigation scheme, the user could benefit from switching to the standard navigation scheme, or the like.

The information window 620 may also display a second statement providing an estimate of the amount of time (N) that the user could have saved using the standard navigation scheme. The design engine 105 may generate the estimate of the amount of time (N) that the user could have saved using the following formula: estimated time savings=(time period spent performing the detected pattern of navigation actions using the first-person navigation scheme)×(computed multiplier). The time period spent performing the detected pattern of navigation actions may comprise the predetermined threshold time period. The computed multiplier may reflect an estimate of how much faster the standard navigation scheme is over the first-person navigation scheme in performing the detected pattern of navigation actions. The computed multiplier may be previously determined through real-world testing of a group of users performing the same navigation actions/tasks using both the first-person navigation scheme and the standard navigation scheme. For example, empirical measurements may be recorded for the group of users performing each pattern of navigation actions/tasks using both navigation schemes, and an average percentage speed-up for the standard navigation scheme over the first-person navigation scheme may be computed to determine the computed multiplier for each pattern in the set of patterns.

The information window 620 may also display a first selectable prompt for the user to switch to the standard navigation scheme. If the user selects to switch to the standard navigation scheme, the design engine 105 then causes the navigation scheme to switch from the first-person navigation scheme to the standard navigation scheme. In other embodiments, rather than manually switching to the standard navigation scheme (via the selectable prompt), the design engine 105 automatically switches to the standard navigation scheme upon detecting a pattern of navigation actions in the set of patterns. The information window 620 may also display a second selectable prompt for the user to view learning materials and/or tutorials (second navigation scheme documents 130) for the standard navigation scheme. If the user selects the second prompt, the design engine 105 then displays the second navigation scheme documents 130.

Figure 7:
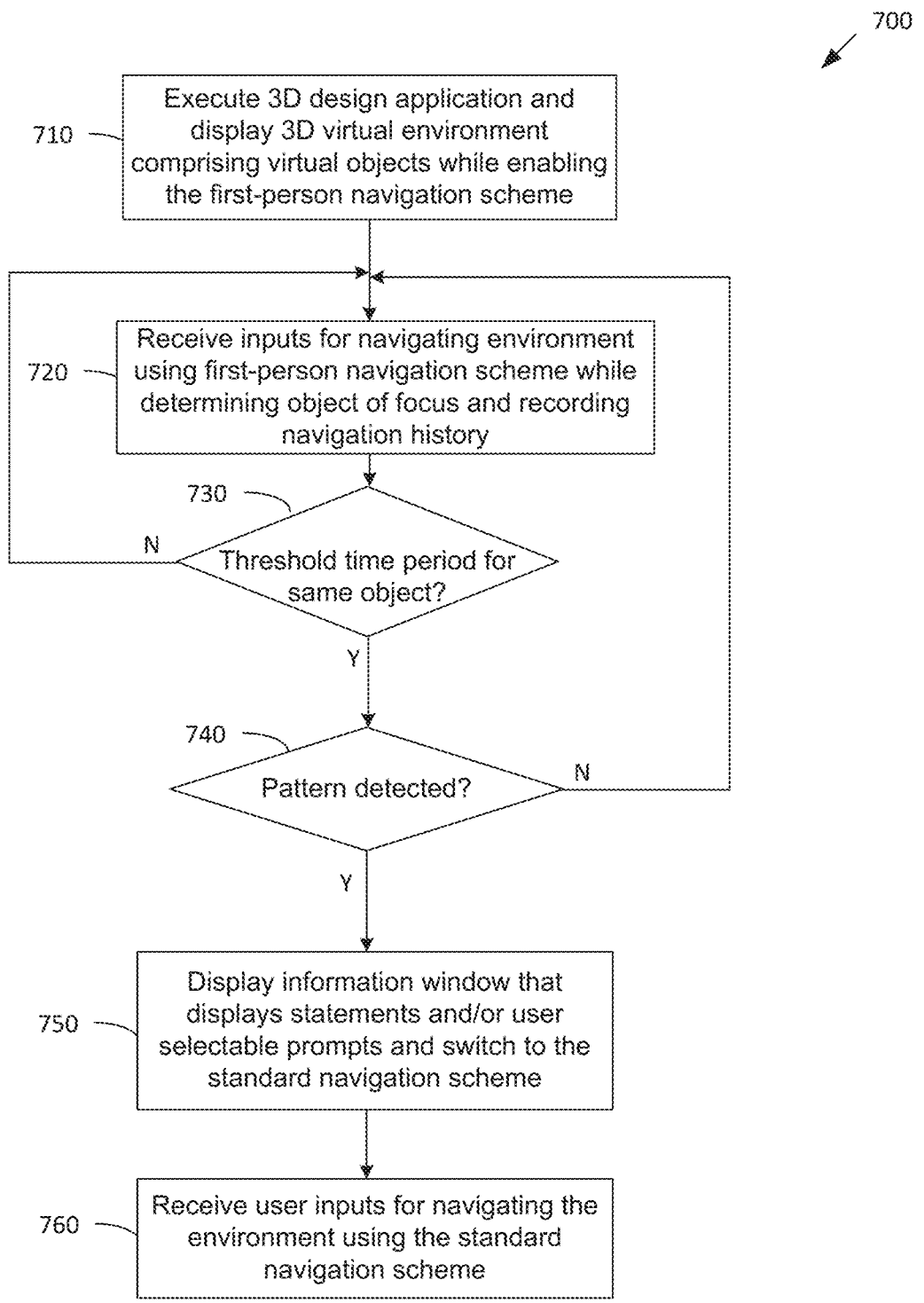
FIG. 7 illustrates a flow diagram of method steps for transitioning from a first navigation scheme to a second navigation scheme, according to various embodiments of the present invention.

FIG. 7 illustrates a flow diagram of method steps for transitioning from a first navigation scheme to a second navigation scheme by detecting patterns of navigation actions, according to various embodiments of the present invention. Although the method steps are described in conjunction with the systems of FIG. 1-6, persons skilled in the art will understand that any system configured to perform the method steps, in any order, is within the scope of the present invention. In some embodiments, the method steps are performed by a design engine 105 executing on a computer system 101.

As shown, a method 700 begins at step 710, where the design engine 105, when executed by processing unit 102, executes a 3D design application that generates and displays a 3D virtual environment comprising one or more virtual objects. At step 710, the design engine 105 initially enables the first-person navigation scheme that utilizes camera position and camera orientation tools for navigating a virtual camera through the 3D virtual environment. At step 720, the design engine 105 receives user inputs for navigating the 3D virtual environment using the first-person navigation scheme and generates and displays the 3D virtual environment based on the received user inputs. The received user inputs perform a set of navigation actions within the 3D virtual environment. At step 720, while the design engine 105 receives user inputs, the design engine 105 also determines an object of focus (e.g. by using a center area 450 or intersection point 460) within the 3D virtual environment and records the navigation history of the user inputs using the first-person navigation scheme.

At step 730, the design engine 105 determines if a same object has been an object of focus for a threshold period of time (x). In particular, the design engine 105 determines if the received user inputs perform a set of navigation actions that focus on the same object for a threshold time period. If not (at 730—No), the method 700 continues at step 720. If so (at 730—Yes), the method 700 continues at step 740.

At step 740, the design engine 105 determines if the user inputs have performed a set of navigation actions comprising a predetermined pattern of navigation actions (from a set of predetermined patterns). In particular, the design engine 105 determines if the user has performed a predetermined pattern of navigation actions (using the first-person navigation scheme) on the object that has been the object of focus for the threshold time period. The design engine 105 may implement various techniques to determine if the user has performed a predetermined pattern of navigation actions. For example, the design engine 105 may determine a first time point A corresponding to the time point when the same object first became the object of focus and a second time point B when the threshold time period for focusing on the same object was satisfied. The design engine 105 may then load the navigation history of the user's inputs using the first-person navigation scheme from time points A and B. The navigation history may include a plurality of time-stamped events (such as camera position, camera orientation, and the object of focus) that occurred during time points A and B. A particular pattern of navigation actions could be then be detected by applying a set of heuristics (corresponding to the particular pattern) to the navigation history. For example, the set of heuristics may determine if the user has spent the threshold time period viewing a same object from a range of different distances or from a range of different angles.

If the design engine 105 determines that the user has not performed a predetermined pattern of navigation actions (at 740—No), the method 700 continues at step 720. If the design engine 105 determines that the user has performed a predetermined pattern of navigation actions (at 740—Yes), the method 700 continues at step 750.

At step 750, the design engine 105 performs one or more responsive operations, including manually or automatically switching the first-person navigation scheme to the standard navigation scheme. For example, the design engine 105 may generate and display an information window 620 that displays one or more statements and/or user selectable prompts. The information window 620 may include a first statement informing the user that the recent navigation actions may be more efficiently performed using the standard navigation scheme, or the like. The information window 620 may also display a second statement providing an estimate of the amount of time (N) that the user could have saved using the standard navigation scheme. The information window 620 may also display a first selectable prompt for the user to switch to the standard navigation scheme. If the user selects to switch to the standard navigation scheme, the design engine 105 then implements the standard navigation scheme for navigating the 3D virtual environment. In other embodiments, the design engine 105 automatically switches to the standard navigation scheme upon detecting the pattern of navigation actions (at step 740). The information window 620 may also display a second selectable prompt for the user to view learning materials and/or tutorials (second navigation scheme documents 130) for the standard navigation scheme. If the user selects the second prompt, the design engine 105 then displays the second navigation scheme documents 130.

At step 760, if the navigation scheme has been switched to the standard navigation scheme (either manually or automatically), the design engine 105 receives user inputs for navigating the 3D virtual environment using the standard navigation scheme. The method 700 then ends.

Section III: Transitioning the Navigation Scheme when Function Tool Used

The design engine 105 may initially implement the first navigation scheme (first-person navigation scheme), whereby the design engine 105 receives user inputs that navigate the 3D virtual environment using the set of navigation tools of the first-person navigation scheme (such as camera position and camera orientation). As described above, a standard navigation scheme comprises a set of navigation tools (such as orbit, pan, zoom tools) for navigating the 3D virtual environment and a set of function tools (such as fillet, move, or box tools) for configuring/manipulating virtual objects. Each function tool comprises a function tool that is object-centric and designed for use with the standard navigation scheme. In some embodiments, while the first navigation scheme is enabled, the design engine 105 also provides the set of function tools of the standard navigation scheme for selection and use by the user. In particular, the design engine 105 may initially enable the navigation tools of the first-person navigation scheme (and not enable the navigation tools of the standard navigation scheme), while also enabling the function tools of the standard navigation scheme. While the user is using the first-person navigation scheme, the design engine 105 monitors for user selection of a function tool. If the design engine 105 detects a user selection of a function tool, the design engine 105 may switch the first-person navigation scheme to the standard navigation scheme during use of the function tool (enable the navigation tools of the standard navigation scheme and disable the navigation tools of the first-person navigation scheme).

Upon receiving selection of a function tool, the design engine 105 generates and displays a UI dialog window corresponding to the selected function tool. The UI dialog window displays a set of user-configurable parameters corresponding to the selected function tool that may be applied to a particular object. In general, after a function tool is selected, the design engine 105 will then prompt the user to select a particular object within the 3D virtual environment to which the selected function tool is applied. In some embodiments, the design engine 105 may automatically switch the first-person navigation scheme to the standard navigation scheme in response to receiving a selection of a function tool (enable the navigation tools of the standard navigation scheme and disable the navigation tools of the first-person navigation scheme after receiving selection of a function tool). In other embodiments, the design engine 105 may automatically switch the first-person navigation scheme to the standard navigation scheme in response to receiving a selection of an object to which the function tool is applied (enable the navigation tools of the standard navigation scheme and disable the navigation tools of the first-person navigation scheme after receiving selection of a function tool and after receiving selection of an object).

In either case, the navigation tools of the standard navigation scheme are enabled while the user configures/manipulates the selected object using the selected function tool (via the displayed UI dialog window). Configuring the parameters in the UI dialog window may be more efficient when using the navigation tools of the standard navigation scheme (as compared to the first-person navigation scheme) as the standard navigation tools allows the user to easily view different angles, areas, and details of the selected object by utilizing the standard orbit, pan, and zoom navigation tools. Viewing of the different angles, areas, and details of the selected object can inform the user when deciding how to configure the parameters for the selected object via the UI dialog window. When the user closes the function tool, the design engine may then automatically switch the standard navigation scheme back to the first-person navigation scheme (enable the navigation tools of the first-person navigation scheme and disable the navigation tools of the standard navigation scheme).

Figure 8A:
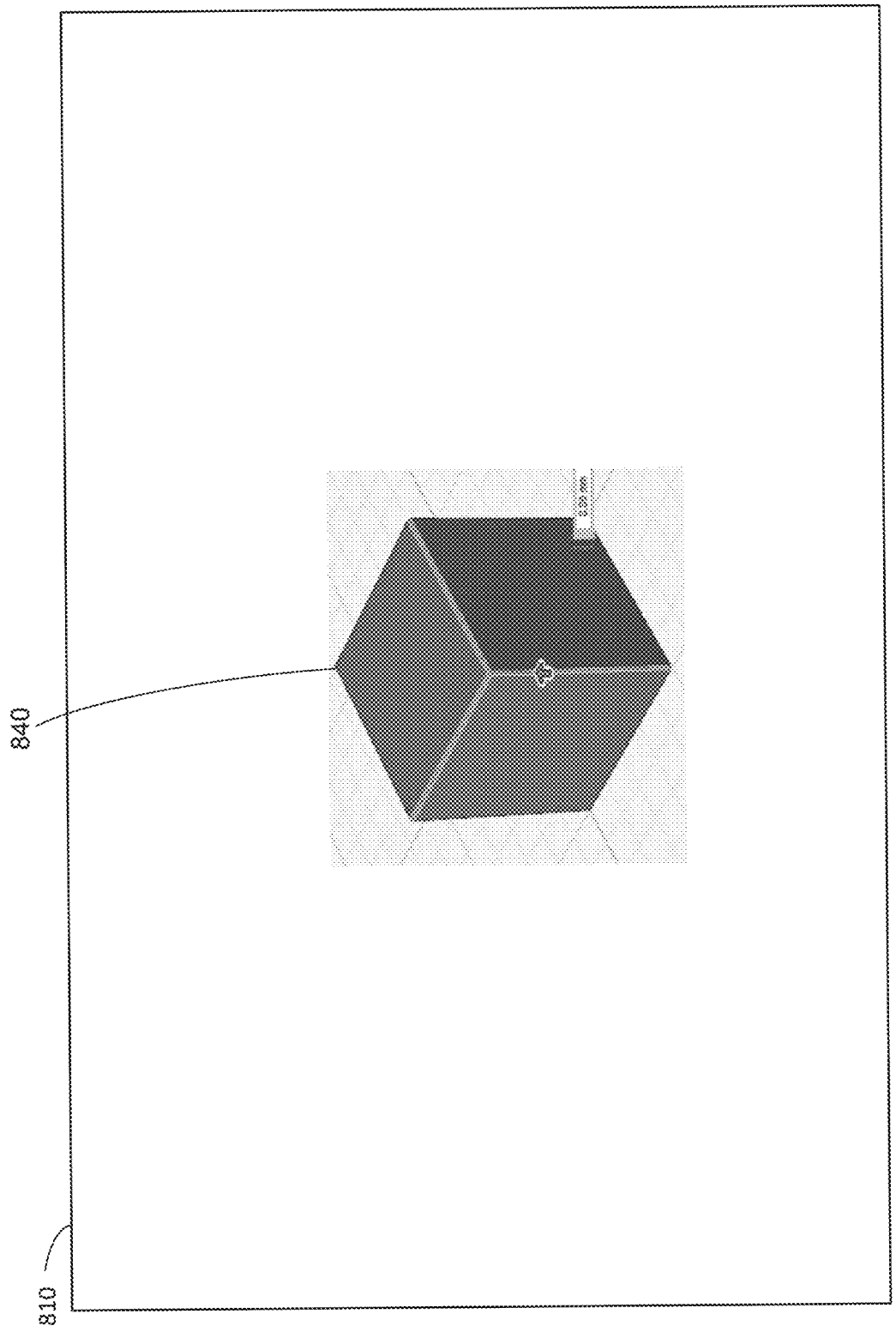
FIG. 8A is a conceptual illustration of a GUI displaying a cube object within a 3D virtual environment.
Figure 8B:
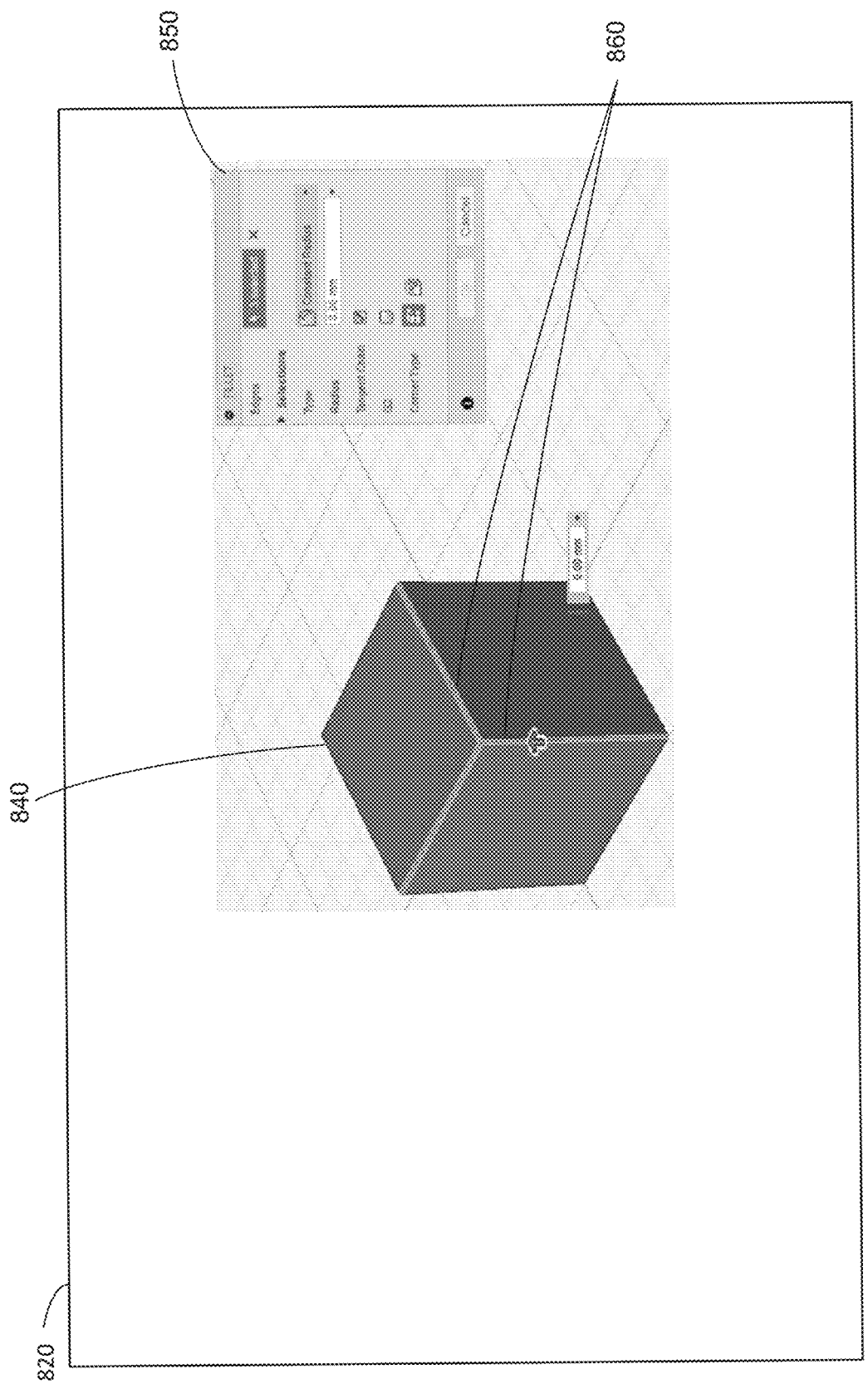
FIG. 8B is a conceptual illustration of a GUI displaying a selection of a fillet tool, according to various embodiments of the present invention.
Figure 8C:
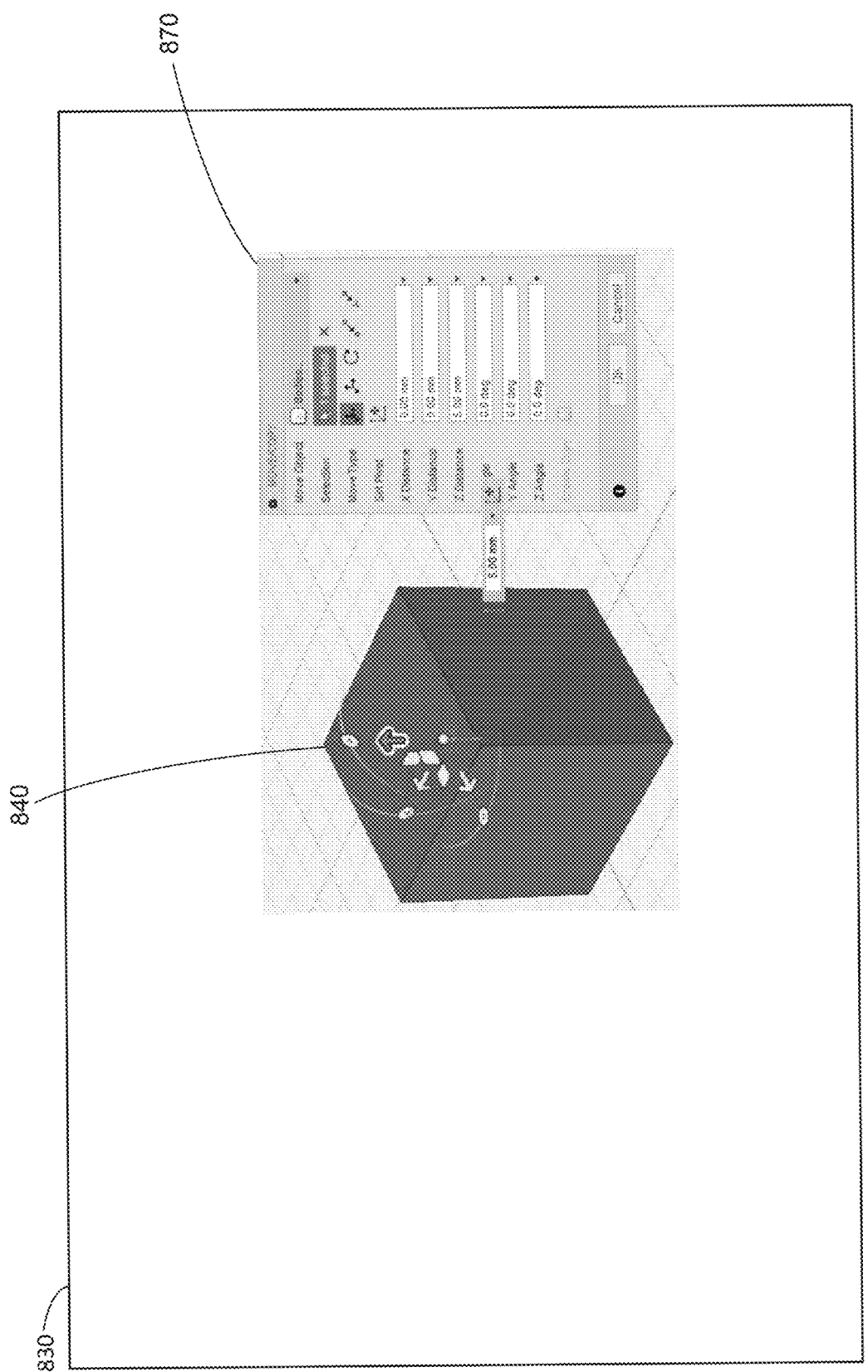
FIG. 8C is a conceptual illustration of a GUI displaying a selection of a move/copy tool, according to various embodiments of the present invention.

FIGS. 8A-C show GUI screenshots illustrating user selection of various function tools, according to various embodiments of the present invention. FIG. 8A is a conceptual illustration of a GUI screenshot 810 displaying a cube object 840 within a 3D virtual environment. In the example of FIG. 8A, the user is currently navigating the 3D virtual environment using first-person navigation scheme, according to various embodiments of the present invention. While the first-person navigation scheme is enabled, the design engine 105 also enables a set of function tools (such as a fillet tool or move tool) of the standard navigation scheme.

FIG. 8B is a conceptual illustration of a GUI screenshot 820 displaying a selection of a fillet tool, according to various embodiments of the present invention. In the example of FIG. 8B, the user selects the fillet tool while navigating the 3D virtual environment using the first-person navigation scheme as shown in FIG. 8A. In general, the fillet tool may be used to round edges of an object and creating a smooth curved connection between planes that intersect at an edge. When the fillet tool activated, an edge or multiple edges of a virtual object are selected, the "radius" of the fillet is specified, and the fillet operation creates a rounded transition on the specified edges using the radius provided. Upon receiving selection of the fillet tool, the design engine 105 generates and displays a UI dialog window corresponding to the fillet tool (fillet-tool UI window 850). The fillet-tool UI window 850 displays a set of user-configurable parameters corresponding to the fillet tool that may be applied to a particular object. The design engine 105 then prompts the user to select a particular object within the 3D virtual environment to which the fillet tool is applied. The design engine 105 may automatically enable/switch to the standard navigation scheme in response to receiving selection of the fillet tool. In other embodiments, the design engine 105 may automatically enable/switch to the standard navigation scheme after receiving selection of the object to which the fillet tool is applied.

In either case, the standard navigation scheme is enabled while the user configures the selected object via the displayed fillet-tool UI window 850. Thus, while the fillet tool is still active and the fillet-tool UI window 850 is still displayed, the design engine 105 receives user inputs using the standard navigation tools that apply to the selected object (e.g., orbit, pan, and/or zoom inputs for the selected object) and displays the selected object according to the received user inputs to display different views of the selected object (e.g., at different angles or levels of zoom). Viewing the selected object using the standard navigation tools may assist the user in deciding how to configure the selected object via the fillet-tool UI window 850. For example, the user may use the orbit navigation tool to view the selected object from different angles and select the edges 860 that the fillet operation is applied to. When the design engine 105 receives a user selection to close the fillet tool, the design engine 105 then automatically enables/switches back to the first-person navigation scheme. For example, the user may close the fillet tool by selecting to apply the configured parameters (clicking "OK" in the fillet-tool UI window 850) or otherwise causing the fillet tool and/or fillet-tool UI window 850 to close. Thus, after closing the fillet tool, the design engine 105 then receives user inputs using the first-person navigation scheme and displays the 3D virtual environment according to the received user inputs.

FIG. 8C is a conceptual illustration of a GUI screenshot 820 displaying a selection of a move/copy tool, according to various embodiments of the present invention. In the example of FIG. 8C, the user selects the move/copy tool while navigating the 3D virtual environment using the first-person navigation scheme as shown in FIG. 8A. In general, the move/copy tool may be used to move a selected object to a new position within the 3D virtual environment or copy a selected object to a new position within the 3D virtual environment.

Upon receiving selection of the move/copy tool, the design engine 105 generates and displays a UI dialog window corresponding to the move/copy tool (move/copy-tool UI window 870). The move/copy-tool UI window 870 displays a set of user-configurable parameters corresponding to the move/copy tool that may be applied to a particular object. The design engine 105 then prompts the user to select a particular object within the 3D virtual environment to which the move/copy tool is applied. The design engine 105 may automatically enable/switch to the standard navigation scheme in response to receiving selection of the move/copy tool. In other embodiments, the design engine 105 may automatically enable/switch to the standard navigation scheme after receiving selection of the object to which the move/copy tool is applied. In either case, the standard navigation scheme is enabled while the user configures the selected object via the displayed move/copy-tool UI window 870. Thus, while the move/copy tool is still active and the move/copy-tool UI window 870 is still displayed, the design engine 105 receives user inputs using the standard navigation tools that apply to the selected object (e.g., orbit, pan, and/or zoom inputs for the selected object) and displays the selected object according to the received user inputs. When the design engine 105 receives a user selection to close the move/copy tool, the design engine 105 then automatically enables/switches back to the first-person navigation scheme. For example, the user may close the move/copy tool by selecting to apply the configured parameters (clicking "OK" in the move/copy-tool UI window 870) or otherwise causing the move/copy tool and/or move/copy-tool UI window 870 to close. Thus, after closing the move/copy tool, the design engine 105 then receives user inputs using the first-person navigation scheme and displays the 3D virtual environment according to the received user inputs.

The fillet tool shown in FIG. 8B and the move/copy tool shown in FIG. 8C are for illustratively purposes only. In other embodiments, other function tools of the standard navigation scheme may also be utilized. For example, a box tool (for defining dimensions of a box), 2D sketching tools (for drawing shapes are used to create new 3D virtual objects), and the like. In other embodiments, other function tools of the standard navigation scheme than those described herein may also be utilized. In further embodiments, only a subset of all function tools available in the standard navigation scheme may trigger switching of the first-person navigation scheme to the standard navigation scheme. In these embodiments, the subset of function tools may comprise those function tools that are determined to be more easily utilized using the standard navigation scheme in comparison to the first-person navigation scheme.

Figure 9:
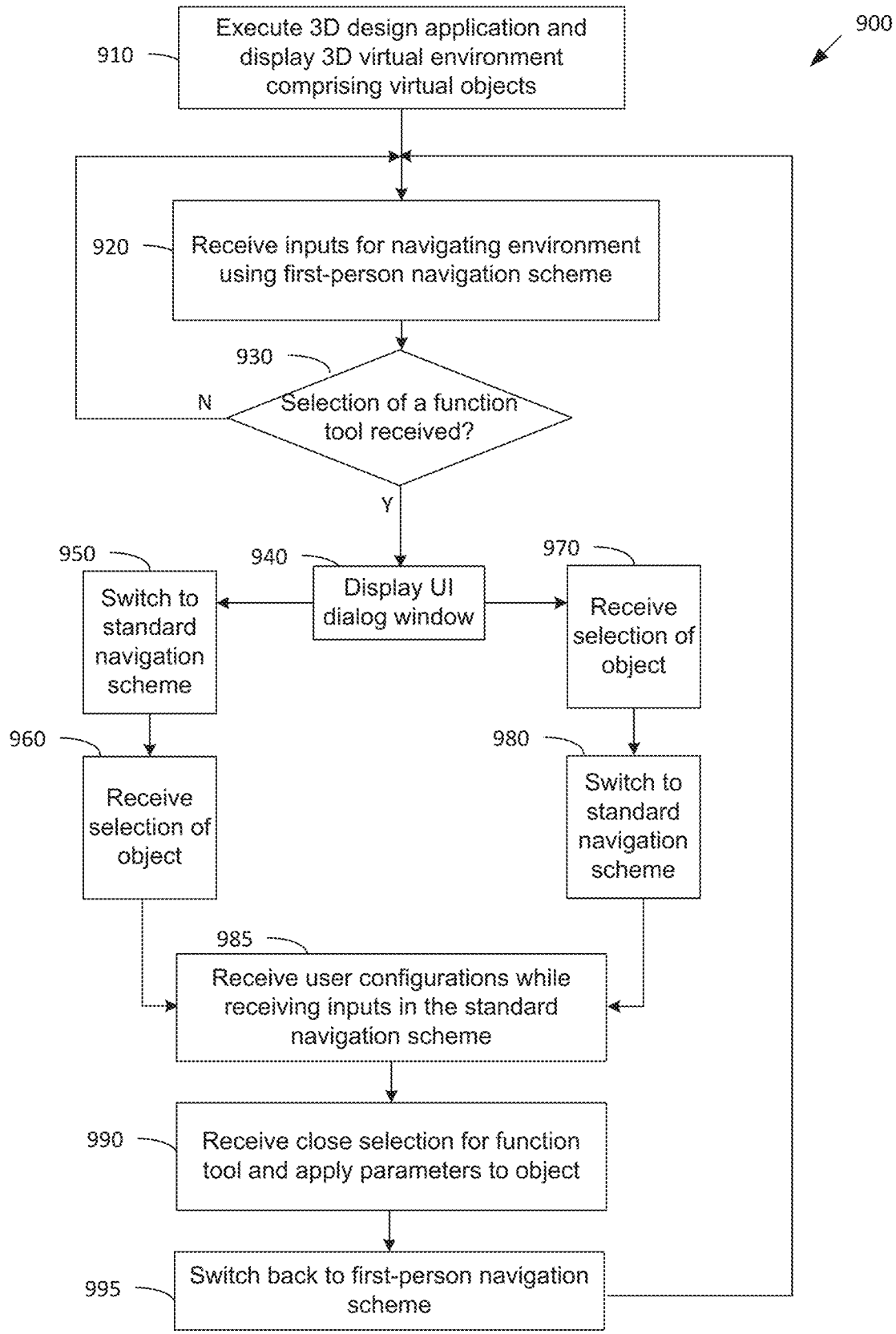
FIG. 9 illustrates a flow diagram of method steps for transitioning from a first navigation scheme to a second navigation scheme, according to other various embodiments of the present invention.

FIG. 9 illustrates a flow diagram of method steps for transitioning from a first navigation scheme to a second navigation scheme, according to other various embodiments of the present invention. Although the method steps are described in conjunction with the systems of FIGS. 1-6 and 8A-C, persons skilled in the art will understand that any system configured to perform the method steps, in any order, is within the scope of the present invention. In some embodiments, the method steps are performed by a design engine 105 executing on a computer system 101.

As shown, a method 900 begins at step 910, where the design engine 105, when executed by processing unit 102, executes a 3D design application that generates and displays a 3D virtual environment comprising one or more virtual objects. At step 910, the design engine 105 initially enables the first-person navigation scheme (by enabling the first-person navigation tools) while also enabling a set of function tools of the standard navigation scheme. Thus, at step 910, the design engine 105 initially enables the first-person navigation tools (such as camera position and camera orientation tools) and not the standard navigation tools (such as orbit, pan, zoom tools). At step 920, the design engine 105 receives user inputs for navigating the 3D virtual environment using the first-person navigation scheme and generates and displays the 3D virtual environment based on the received user inputs. At step 930, the design engine 105 determines if a user selection of a function tool of the standard navigation scheme is received. If not (at 930—No), the method 900 continues at step 920. If so (at 930—Yes), the method 900 continues at step 940.

At step 940, the design engine 105, upon receiving selection of the function tool, the design engine 105 generates and displays a UI dialog window corresponding to the selected function tool. The UI dialog window displays a set of user-configurable parameters corresponding to the selected function tool that may be applied to a particular object. After the UI dialog window is displayed, the method 900 may perform either steps 950-960 or steps 970-980, depending on how the design engine 105 is configured.

At step 950, upon receiving selection of the function tool, the design engine 105 automatically switches the first-person navigation scheme to the standard navigation scheme (enables the navigation tools of the standard navigation scheme and disables the navigation tools of the first-person navigation scheme). At step 960, the design engine 105 prompts the user to select an object that the selected function tool is applied and receives selection of an object. The method 900 then continues at step 985.

At step 970, the design engine 105 prompts the user to select an object that the selected function tool is applied and receives selection of an object. At step 980, upon receiving selection of the object, the design engine 105 automatically switches the first-person navigation scheme to the standard navigation scheme (enables the navigation tools of the standard navigation scheme and disables the navigation tools of the first-person navigation scheme). The method 900 then continues at step 985.

At step 985, the design engine 105 receives user configurations of the selected object using the selected function tool (via the UI dialog window). While receiving the user configurations, the design engine 105 may also receive user inputs for interacting with the selected object using the standard navigation scheme (e.g., orbit, pan, and/or zoom inputs) and displays the selected object based on the received user inputs. At step 990, the design engine 105 receives a user selection for closing/ending the selected function tool and, in response, applies the user-configured parameters (received via the UI dialog window) to the selected object.

At step 995, in response to receiving the selection for closing the function tool, the design engine 105 automatically switches the standard navigation scheme back to the first-person navigation scheme (enables the navigation tools of the first-person navigation scheme and disables the navigation tools of the standard navigation scheme). The method 900 then continues at step 920 where the design engine 105 receives user inputs for navigating the 3D virtual environment using the first-person navigation scheme and generates and displays the 3D virtual environment based on the received user inputs.

In sum, embodiments of the invention are directed towards techniques for gradually transitioning a user to a second navigation scheme while using a first navigation scheme in a 3D design application. The 3D design application generates and displays a 3D virtual environment containing multiple virtual objects. The 3D design application may implement the second navigation scheme comprising a standard navigation scheme. The standard navigation scheme may include a set of navigation tools (such as orbit, pan, and zoom tools) and a set of function tools (such as move, fillet, and box tools). The 3D design application may further implement the first navigation scheme comprising a first-person navigation scheme including a set of navigation tools (such as camera position/movement and camera orientation tools). The 3D design application may initially enable the first-person navigation scheme, whereby the user initially navigates through the 3D virtual environment and interacts with the virtual objects using the first-person navigation scheme. As described in Section II, the 3D design application monitors for a set of predetermined patterns of navigation actions during use of the first-person navigation scheme. Each predetermined pattern of navigation actions using the first-person navigation scheme may be performed more efficiently when using the standard navigation scheme. If the 3D design application detects a predetermined pattern using the first-person navigation scheme, the 3D design application may manually or automatically switch the first-person navigation scheme to the standard navigation scheme. As described in Section III, while the user is using the first-person navigation scheme, the 3D design application monitors for user selection of a function tool of the standard navigation scheme. The function tool comprises a function tool that is object-centric and designed for use with the standard navigation scheme. If the 3D design application detects a user selection of a function tool, the 3D design application may automatically switch the first-person navigation scheme to the standard navigation scheme during use of the function tool. When the user is finished using the function tool, the 3D design application may automatically switch the standard navigation scheme back to the first-person navigation scheme.

At least one advantage of the disclosed technique is that the technique enables a user to use a more familiar or intuitive navigation scheme (first navigation scheme) when using a 3D design application, and then transition the user to the less familiar or intuitive standard navigation scheme (second navigation scheme) implemented by most 3D design applications. Another advantage of the disclosed technique is that the technique allows a user to gradually learn an unfamiliar navigation scheme (second navigation scheme) by slowly introducing elements of the unfamiliar navigation scheme, while the user primarily uses a familiar navigation scheme (first navigation scheme). Another advantage of the disclosed technique is that the technique may be easily implemented in any 3D design application that implements the standard navigation scheme by adding the technique via a plug-in application to the 3D design application.

1. In some embodiments, a computer-implemented method for navigating a three-dimensional (3D) virtual environment that includes one or more objects, the method comprising: enabling a first navigation scheme for navigating the 3D virtual environment; receiving a plurality of inputs based on the first navigation scheme that cause a first set of navigation actions to occur within the 3D virtual environment; based on a set of navigation patterns, determining that the first set of navigation actions comprises a particular navigation pattern; and in response, enabling a second navigation scheme for navigating the 3D virtual environment 2. The computer-implemented method of clause 1, wherein the particular navigation pattern comprises viewing a first object included within the 3D virtual environment at different distances.

3. The computer-implemented method of clause 1 or 2, wherein the particular navigation pattern comprises viewing a first object included within the 3D virtual environment at different angles.

4. The computer-implemented method of any of clauses 1-3, further comprising receiving one or more inputs based on the second navigation scheme that cause a second set of navigation actions to occur within the 3D virtual environment.

5. The computer-implemented method of any of clauses 1-4, further comprising, in response to determining that the first set of navigation actions comprises the particular navigation pattern, displaying an estimate of an amount of time that is saved using the second navigation scheme, instead of the first navigation scheme, to perform the first set of navigation actions.

6. The computer-implemented method of any of clauses 1-5, further comprising, in response to determining that the first set of navigation actions comprises the particular navigation pattern, displaying a prompt to invoke the second navigation scheme instead of the first navigation scheme.

7. The computer-implemented method of any of clauses 1-6, wherein: the first navigation scheme comprises a first-person navigation scheme that invokes camera position and camera orientation tools; and the second navigation scheme comprises a standard navigation scheme that invokes orbit, pan, and zoom tools.

8. The computer-implemented method of any of clauses 1-7, wherein the 3D virtual environment is generated by a computer-aided design application.

9. The computer-implemented method of any of clauses 1-8, further comprising, before determining that the first set of navigation actions comprises the particular navigation pattern, determining that the navigation actions included in the first set of navigation actions focus on a same object for a threshold period of time.

10. In some embodiments, a non-transitory computer-readable medium storing instructions that, when executed by a processor, cause the processor to perform the steps of: enabling a first navigation scheme for navigating a 3D virtual environment comprising one or more objects; receiving a plurality of inputs based on the first navigation scheme that cause a first set of navigation actions to occur within the 3D virtual environment; based on a set of navigation patterns, determining that the first set of navigation actions comprises a particular navigation pattern; and in response, enabling a second navigation scheme for navigating the 3D virtual environment.

11. The non-transitory computer-readable medium of clause 10, wherein the particular navigation pattern comprises viewing a first object included within the 3D virtual environment at different distances.

12. The non-transitory computer-readable medium of clauses 10 or 11, wherein the particular navigation pattern comprises viewing a first object included within the 3D virtual environment at different angles.

13. The non-transitory computer-readable medium of any of clauses 10-12, further comprising receiving one or more inputs based on the second navigation scheme that cause a second set of navigation actions to occur within the 3D virtual environment.

14. The non-transitory computer-readable medium of any of clauses 10-13, wherein: the first navigation scheme comprises a first-person navigation scheme; and the second navigation scheme comprises an object-centric navigation scheme.

15. The non-transitory computer-readable medium of any of clauses 10-14, wherein the 3D virtual environment is generated by a computer-aided design application.

16. The non-transitory computer-readable medium of any of clauses 10-15, further comprising, before determining that the first set of navigation actions comprises the particular navigation pattern, determining that the navigation actions included in the first set of navigation actions focus on a same object for a threshold period of time.

17. The non-transitory computer-readable medium of any of clauses 10-16, further comprising, in response to determining that the first set of navigation actions comprises the particular navigation pattern, displaying a statement informing the user that recent navigation actions are performed more efficiently using the second navigation scheme.

18. The non-transitory computer-readable medium of any of clauses 10-17, further comprising, in response to determining that the first set of navigation actions comprises the particular navigation pattern, displaying a prompt for displaying tutorial information for the second navigation scheme.

19. In some embodiments, a system comprising: a memory that includes a design engine; and a processor that is coupled to the memory and, when executing the design engine, performs the steps of: enabling a first navigation scheme for navigating a three-dimensional (3D) virtual environment comprising one or more objects; receiving a plurality of inputs based on the first navigation scheme that cause a first set of navigation actions to occur within the 3D virtual environment; based on a set of navigation patterns, determining that the first set of navigation actions comprises a particular navigation pattern; and in response, enabling a second navigation scheme for navigating the 3D virtual environment.

20. The system of clause 19, further comprising, before determining that the first set of navigation actions comprises the particular navigation pattern, determining that the navigation actions included in the first set of navigation actions focus on a same object for a threshold period of time.

21. In some embodiments, a computer-implemented method for navigating a three-dimensional (3D) virtual environment, the method comprising: enabling a first navigation scheme for navigating the 3D virtual environment and a set of function tools for manipulating virtual objects included within the 3D virtual environment; receiving a selection of a first function tool included in the set of function tools; and after receiving the selection of the first function tool, enabling a second navigation scheme for allowing a first virtual object included within the 3D virtual environment to be manipulated via the first function tool.

22. The computer-implemented method of clause 21, further comprising, prior to receiving the selection of the first function tool, receiving one or more inputs based on the first navigation scheme.

23. The computer-implemented method of clause 21 or 22, further comprising: receiving a selection to close the first function tool; and in response, re-enabling the first navigation scheme.

24. The computer-implemented method of any of clauses 21-23, further comprising, after receiving the selection to close the first function tool, receiving one or more inputs based on the first navigation scheme.

25. The computer-implemented method of any of clauses 21-24, further comprising, after receiving the selection of the first function tool, receiving a selection of the first virtual object to which the first function tool applies, wherein the second navigation scheme is enabled after receiving the selection of the first virtual object.

26. The computer-implemented method of any of clauses 21-25, wherein: the first navigation scheme comprises a first-person navigation scheme that invokes camera position and camera orientation tools; and the second navigation scheme comprises a standard navigation scheme that invokes orbit, pan, and zoom tools.

27. The computer-implemented method of any of clauses 21-26, wherein the first function tool enables configurable parameters to be applied to the first virtual object.

28. The computer-implemented method of any of clauses 21-27, further comprising, after enabling the second navigation scheme, receiving one or more inputs based on the second navigation scheme while the selected function tool is active.

29. The computer-implemented method of any of clauses 21-28, wherein: enabling the first navigation scheme comprises enabling a first set of navigation tools associated with the first navigation scheme; and enabling the second navigation scheme comprises enabling a second set of navigation tools associated with the second navigation scheme.

30. In some embodiments, a non-transitory computer-readable medium storing instructions that, when executed by a processor, cause the processor to perform the steps of: enabling a first navigation scheme for navigating a 3D virtual environment and a set of function tools for manipulating virtual objects included within the 3D virtual environment; receiving a selection of a first function tool included in the set of function tools; and after receiving the selection of the first function tool, enabling a second navigation scheme for allowing a first virtual object included within the 3D virtual environment to be manipulated via the first function tool.

31. The non-transitory computer-readable medium of clause 30, further comprising, prior to receiving the selection of the first function tool, receiving one or more inputs based on the first navigation scheme.

32. The non-transitory computer-readable medium of clause 30 or 31, further comprising: receiving a selection to close the first function tool; and in response, re-enabling the first navigation scheme.

33. The non-transitory computer-readable medium of any of clauses 30-32, further comprising, after receiving the selection to close the first function tool, receiving one or more inputs based on the first navigation scheme.

34. The non-transitory computer-readable medium of any of clauses 30-33, further comprising, after receiving the selection of the first function tool, receiving a selection of the first virtual object to which the first function tool applies, wherein the second navigation scheme is enabled after receiving the selection of the first virtual object.

35. The non-transitory computer-readable medium of any of clauses 30-34, wherein: the first navigation scheme comprises a first-person navigation scheme that invokes camera position and camera orientation tools; and the second navigation scheme comprises a standard navigation scheme that invokes orbit, pan, and zoom tools.

36. The non-transitory computer-readable medium of any of clauses 30-35, further comprising: after receiving selection of the first function tool, displaying a dialog window corresponding to the first function tool for configuring parameters to be applied to the first virtual object.

37. The non-transitory computer-readable medium of any of clauses 30-36, further comprising: after enabling the second navigation scheme, receiving one or more inputs based on the second navigation scheme that cause a change in view of the first virtual object.

38. The non-transitory computer-readable medium of any of clauses 30-37, wherein: enabling the first navigation scheme comprises enabling a set of navigation tools of the first navigation scheme; and enabling the set of function tools comprises enabling the set of function tools of the second navigation scheme.

39. In some embodiments, a system, comprising: a memory that includes a design engine; and a processor that is coupled to the memory and, when executing the design engine, performs the steps of: enabling a first navigation scheme for navigating the three-dimensional (3D) virtual environment and a set of function tools for manipulating virtual objects included within the 3D virtual environment; receiving a selection of a first function tool included in the set of function tools; and after receiving the selection of the first function tool, enabling a second navigation scheme for allowing a first virtual object included within the 3D virtual environment to be manipulated via the first function tool.

40. The system of clause 39, further comprising: receiving a selection to close the first function tool; and in response, re-enabling the first navigation scheme.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," or "engine." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for navigating a three-dimensional (3D) virtual environment, the method comprising:
  enabling a first navigation scheme for navigating the 3D virtual environment and a set of function tools for manipulating virtual objects included within the 3D virtual environment;
  receiving a selection of a first function tool included in the set of function tools; and
  in response to receiving the selection of the first function tool, switching from the first navigation scheme to a second navigation scheme for navigating the 3D virtual environment, wherein the second navigation scheme allows a first virtual object included within the 3D virtual environment to be manipulated via the first function tool, and wherein the second navigation scheme comprises orbit, pan, and zoom tools, and the second navigation scheme does not include the first function tool.

2. The computer-implemented method of claim 1, further comprising, prior to receiving the selection of the first function tool, receiving one or more inputs based on the first navigation scheme.

3. The computer-implemented method of claim 1, further comprising:
receiving a selection to close the first function tool; and
in response to receiving the selection to close the first function tool, switching from the second navigation scheme to the first navigation scheme.

4. The computer-implemented method of claim 3, further comprising, after receiving the selection to close the first function tool, receiving one or more inputs based on the first navigation scheme.

5. The computer-implemented method of claim 1, wherein:
the first navigation scheme comprises a first-person navigation scheme that invokes camera position and camera orientation tools; and
the second navigation scheme comprises a standard navigation scheme that invokes the orbit, pan, and zoom tools.

6. The computer-implemented method of claim 1, wherein the first function tool enables configurable parameters to be applied to the first virtual object.

7. The computer-implemented method of claim 1, further comprising, after switching to the second navigation scheme, receiving one or more inputs based on the second navigation scheme while the first function tool is active.

8. The computer-implemented method of claim 1, wherein:
enabling the first navigation scheme comprises enabling a first set of navigation tools associated with the first navigation scheme; and
switching to the second navigation scheme comprises enabling a second set of navigation tools associated with the second navigation scheme.

9. The computer-implemented method of claim 1, wherein switching from the first navigation scheme to a second navigation scheme comprises disabling the first navigation scheme and enabling the second navigation scheme.

10. The computer-implemented method of claim 1, wherein receiving the selection of the first function tool further comprises determining that the first function tool is associated with the second navigation scheme.

11. The computer-implemented method of claim 1, wherein the first function tool is configured to apply one or more parameters to the first virtual object.

12. The computer-implemented method of claim 1, further comprising, after receiving the selection of the first function tool, receiving a selection of the first virtual object for which to apply the first function tool.

13. The computer-implemented method of claim 1, wherein the first function tool is configured for use with the second navigation scheme.

14. The computer-implemented method of claim 1, wherein:
the first navigation scheme comprises a first set of navigation tools that enables navigation of the 3D virtual environment;
the second navigation scheme comprises a second set of navigation tools that enables navigation of the 3D virtual environment; and
the first set of navigation tools is different from the second set of navigation tools.

15. A non-transitory computer-readable medium storing instructions that, when executed by a processor, cause the processor to perform the steps of:
enabling a first navigation scheme for navigating a 3D virtual environment and a set of function tools for manipulating virtual objects included within the 3D virtual environment;
receiving a selection of a first function tool included in the set of function tools; and
in response to receiving the selection of the first function tool, switching from the first navigation scheme to a second navigation scheme for navigating the 3D virtual environment, wherein the second navigation scheme allows a first virtual object included within the 3D virtual environment to be manipulated via the first function tool, and wherein the second navigation scheme comprises orbit, pan, and zoom tools, and the second navigation scheme does not include the first function tool.

16. The non-transitory computer-readable medium of claim 15, further comprising, prior to receiving the selection of the first function tool, receiving one or more inputs based on the first navigation scheme.

17. The non-transitory computer-readable medium of claim 15, further comprising:
receiving a selection to close the first function tool; and
in response to receiving the selection to close the first function tool, switching from the second navigation scheme to the first navigation scheme.

18. The non-transitory computer-readable medium of claim 17, further comprising, after receiving the selection to close the first function tool, receiving one or more inputs based on the first navigation scheme.

19. The non-transitory computer-readable medium of claim 15, wherein:
the first navigation scheme comprises a first-person navigation scheme that invokes camera position and camera orientation tools; and
the second navigation scheme comprises a standard navigation scheme that invokes the orbit, pan, and zoom tools.

20. The non-transitory computer-readable medium of claim 15, further comprising:
after receiving selection of the first function tool, displaying a dialog window corresponding to the first function tool for configuring parameters to be applied to the first virtual object.

21. The non-transitory computer-readable medium of claim 20, further comprising:
after switching to the second navigation scheme, receiving one or more inputs based on the second navigation scheme while the first function tool is active.

22. The non-transitory computer-readable medium of claim 15, wherein:
enabling the first navigation scheme comprises enabling a set of navigation tools of the first navigation scheme; and
switching to the second navigation scheme comprises enabling a second set of navigation tools associated with the second navigation scheme.

23. A system, comprising:
a memory that includes a design engine; and
a processor that is coupled to the memory and, when executing the design engine, performs the steps of:
enabling a first navigation scheme for navigating the three-dimensional (3D) virtual environment and a set of function tools for manipulating virtual objects included within the 3D virtual environment;

receiving a selection of a first function tool included in the set of function tools; and in response to receiving the selection of the first function tool, switching from the first navigation scheme to a second navigation scheme for navigating the 3D virtual environment, wherein the second navigation scheme allows a first virtual object included within the 3D virtual environment to be manipulated via the first function tool, and wherein the second navigation scheme comprises orbit, pan, and zoom tools, and the second navigation scheme does not include the first function tool.

24. The system of claim 23, further comprising:

receiving a selection to close the first function tool; and in response to receiving the selection to close the first function tool, switching from the second navigation scheme to the first navigation scheme.

* * * * *